Dec. 13, 1927.　　　　　　　　　　　　　　　　　　1,652,198
E. A. GODLEY ET AL
MACHINE FOR GRADING AND MEASURING LUMBER
Filed March 26, 1923　　14 Sheets-Sheet 1
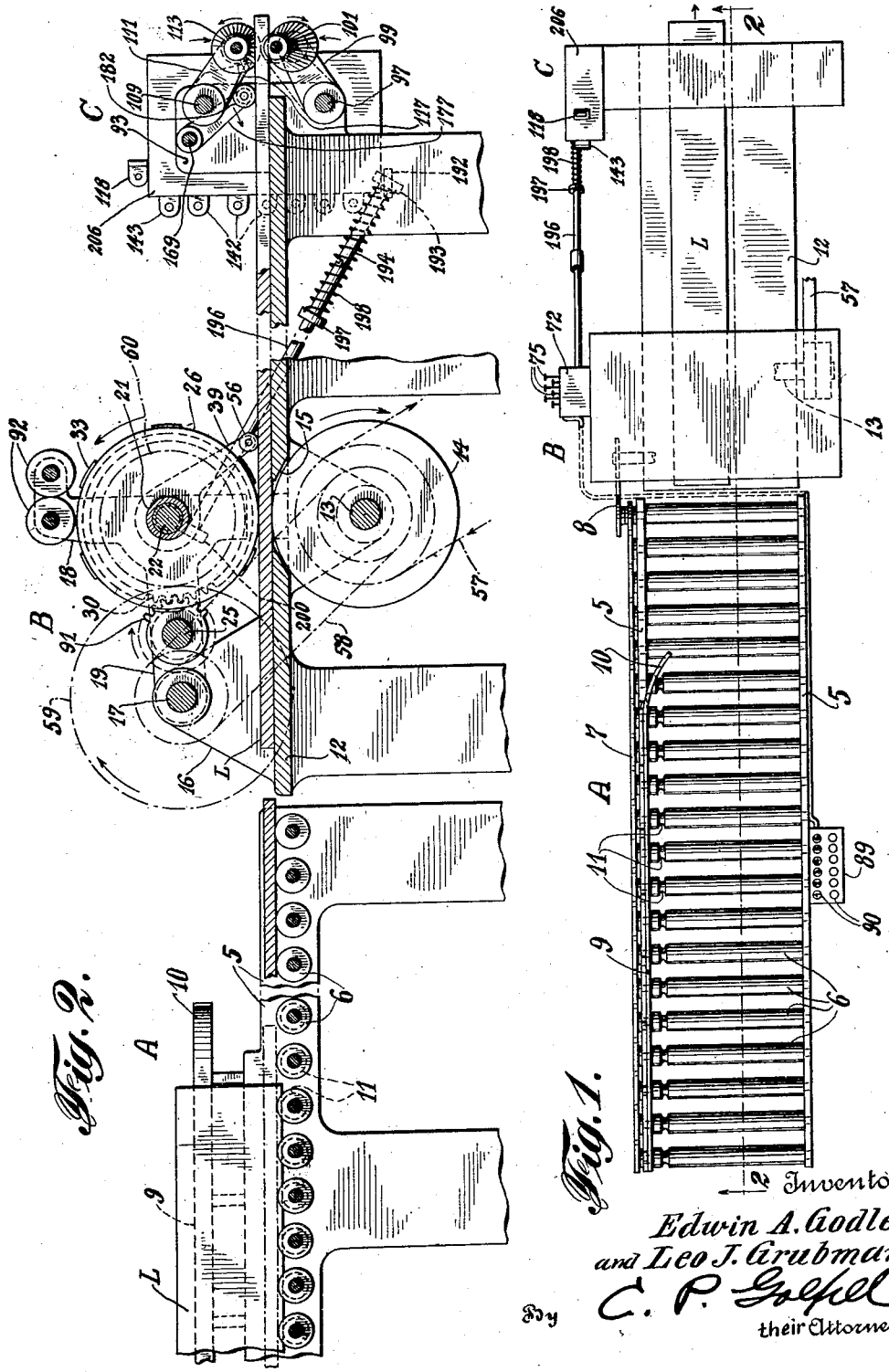

Dec. 13, 1927.  1,652,198
E. A. GODLEY ET AL
MACHINE FOR GRADING AND MEASURING LUMBER
Filed March 26, 1923   14 Sheets-Sheet 2
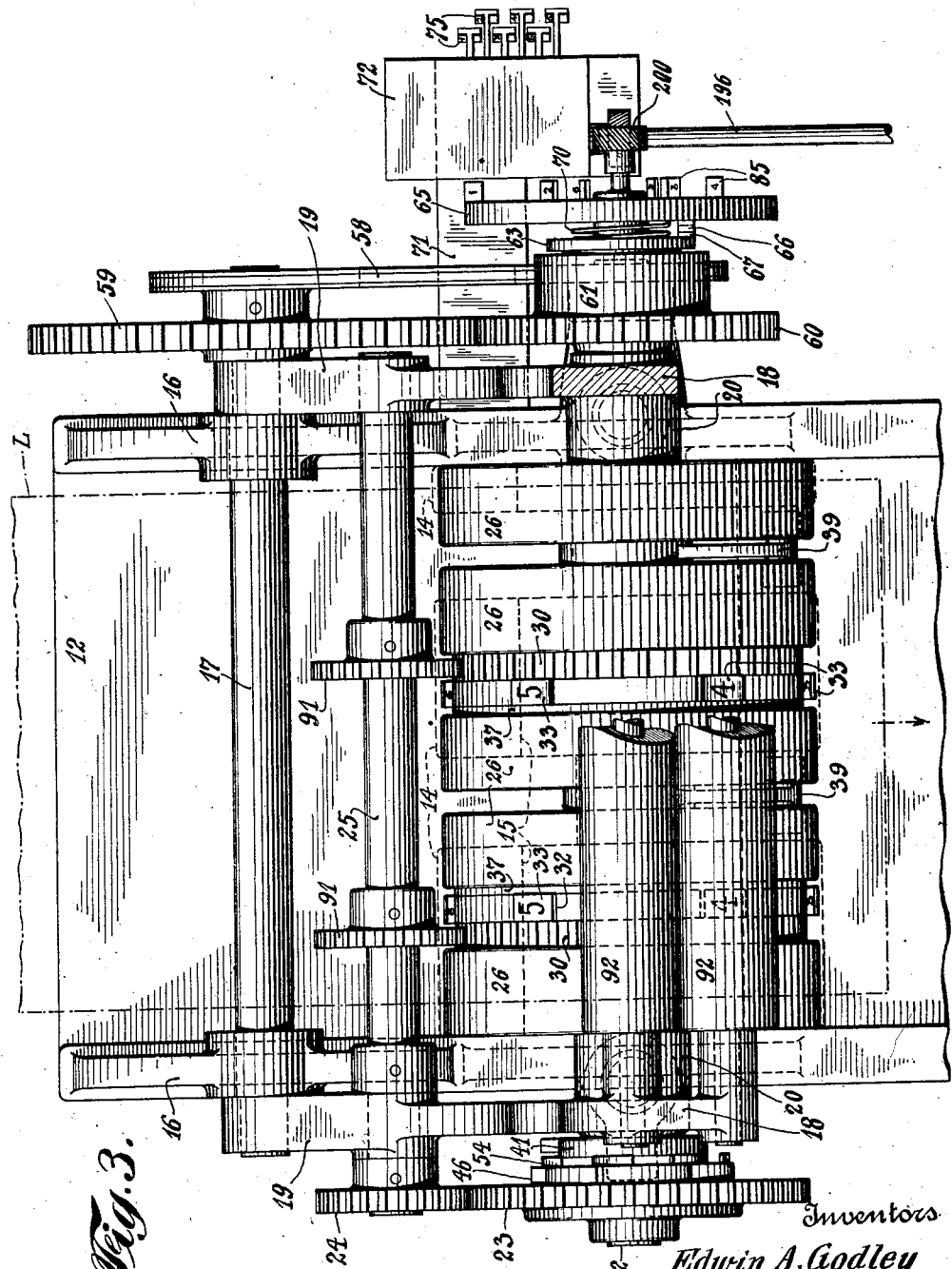

Dec. 13, 1927. 1,652,198
E. A. GODLEY ET AL
MACHINE FOR GRADING AND MEASURING LUMBER
Filed March 26, 1923 14 Sheets-Sheet 3
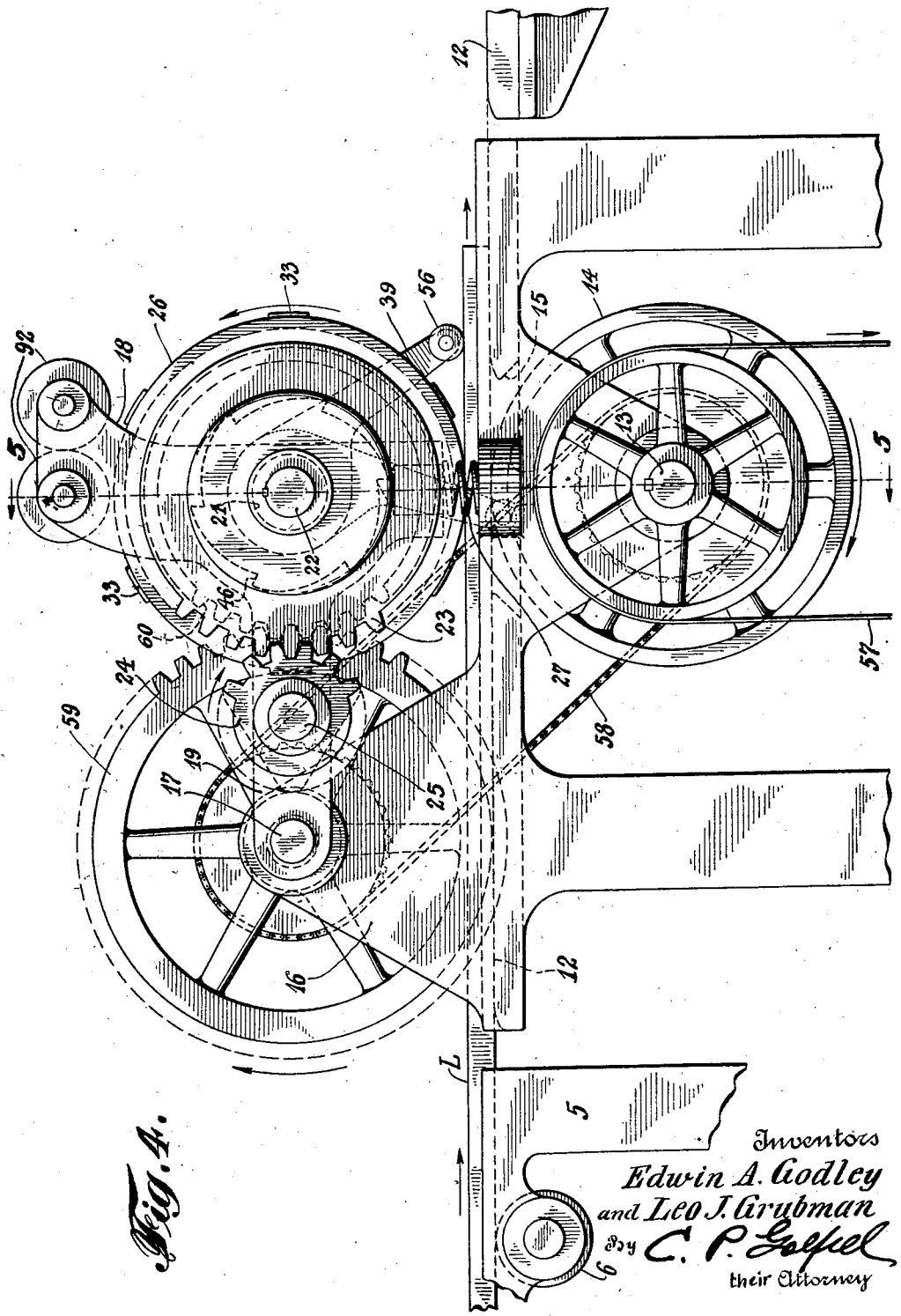

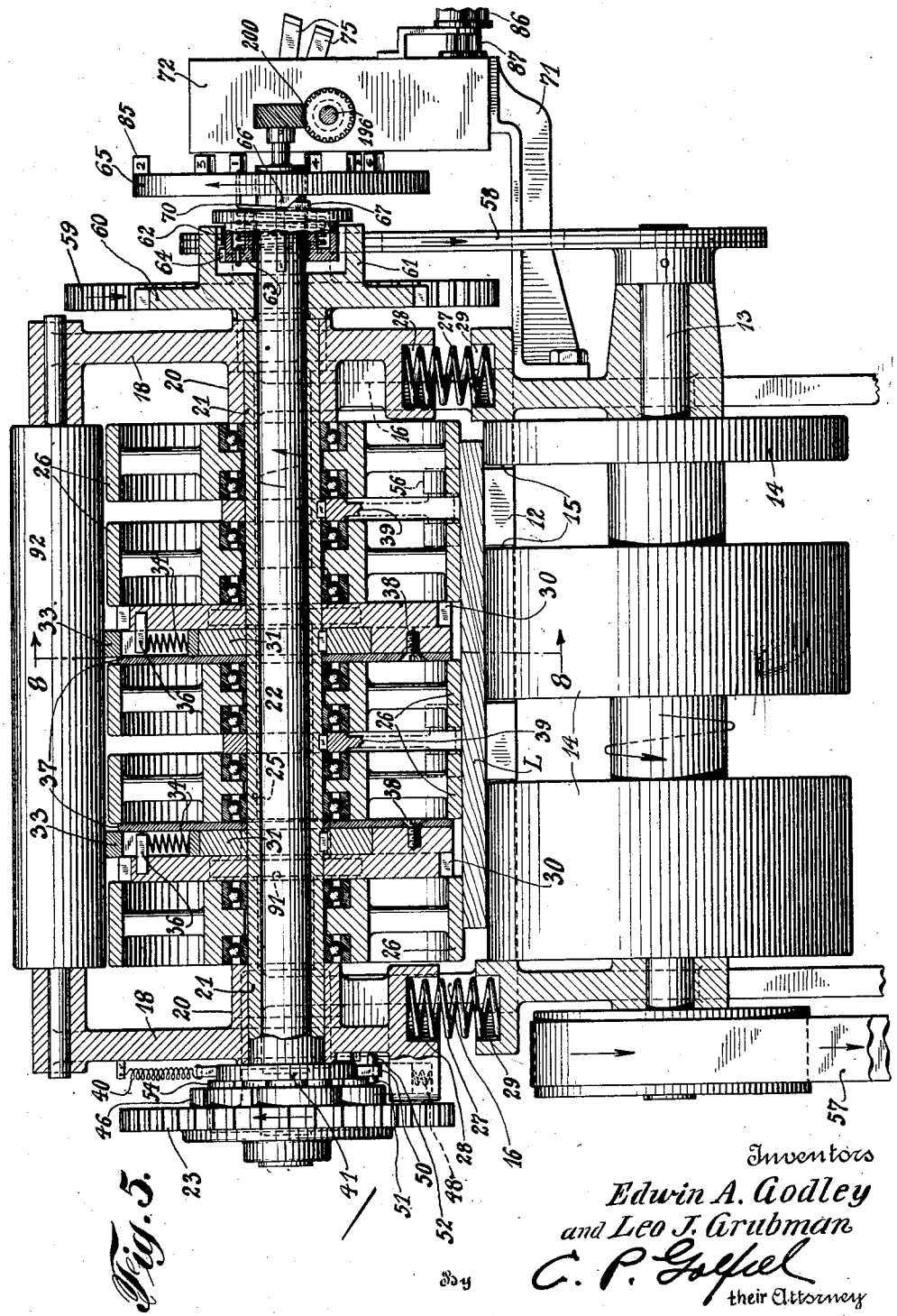

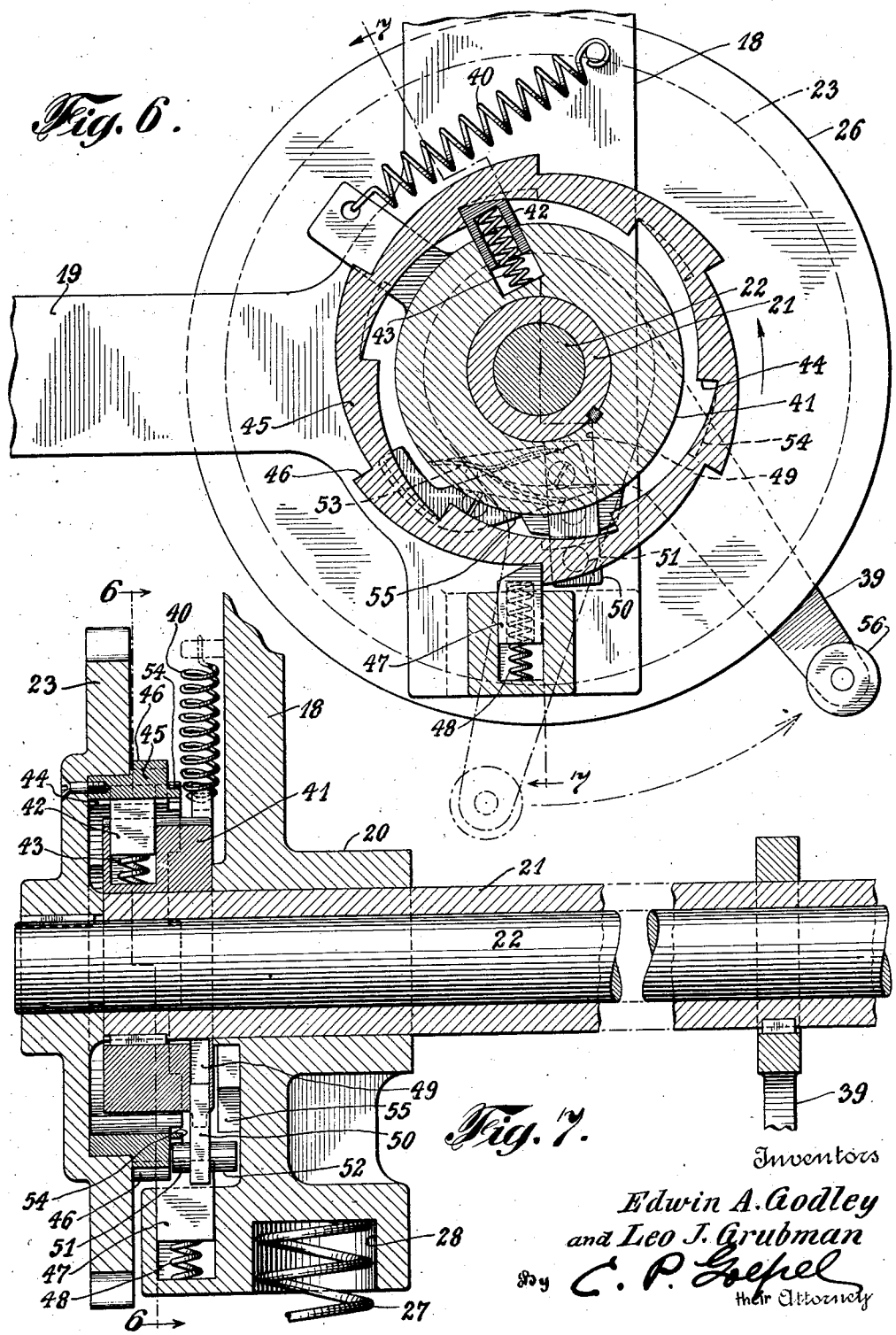

Dec. 13, 1927.  
E. A. GODLEY ET AL  
1,652,198  
MACHINE FOR GRADING AND MEASURING LUMBER  
Filed March 26, 1923  14 Sheets-Sheet 6
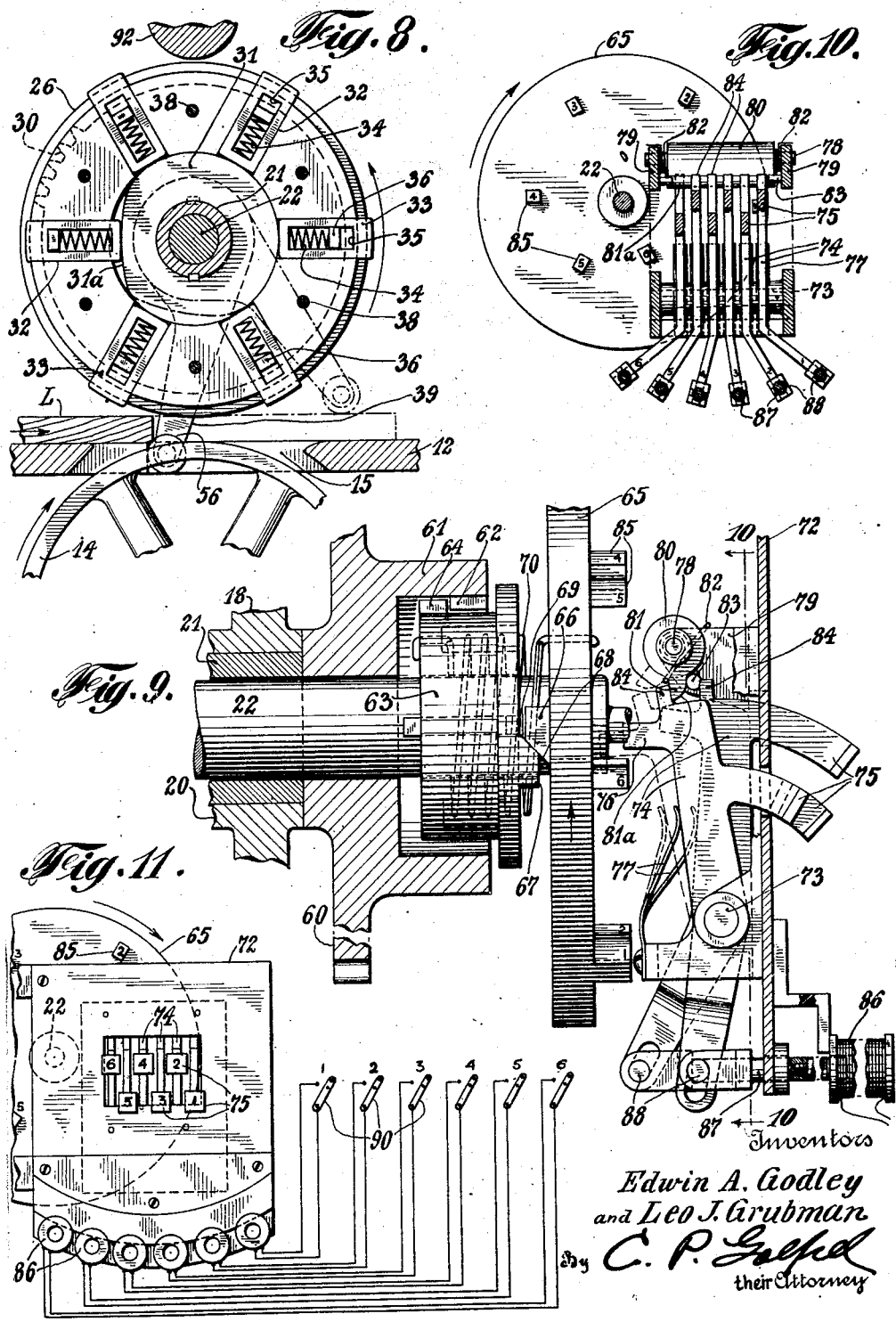
Inventors  
Edwin A. Godley  
and Leo J. Grubman  
by C. P. Goepel  
their Attorney

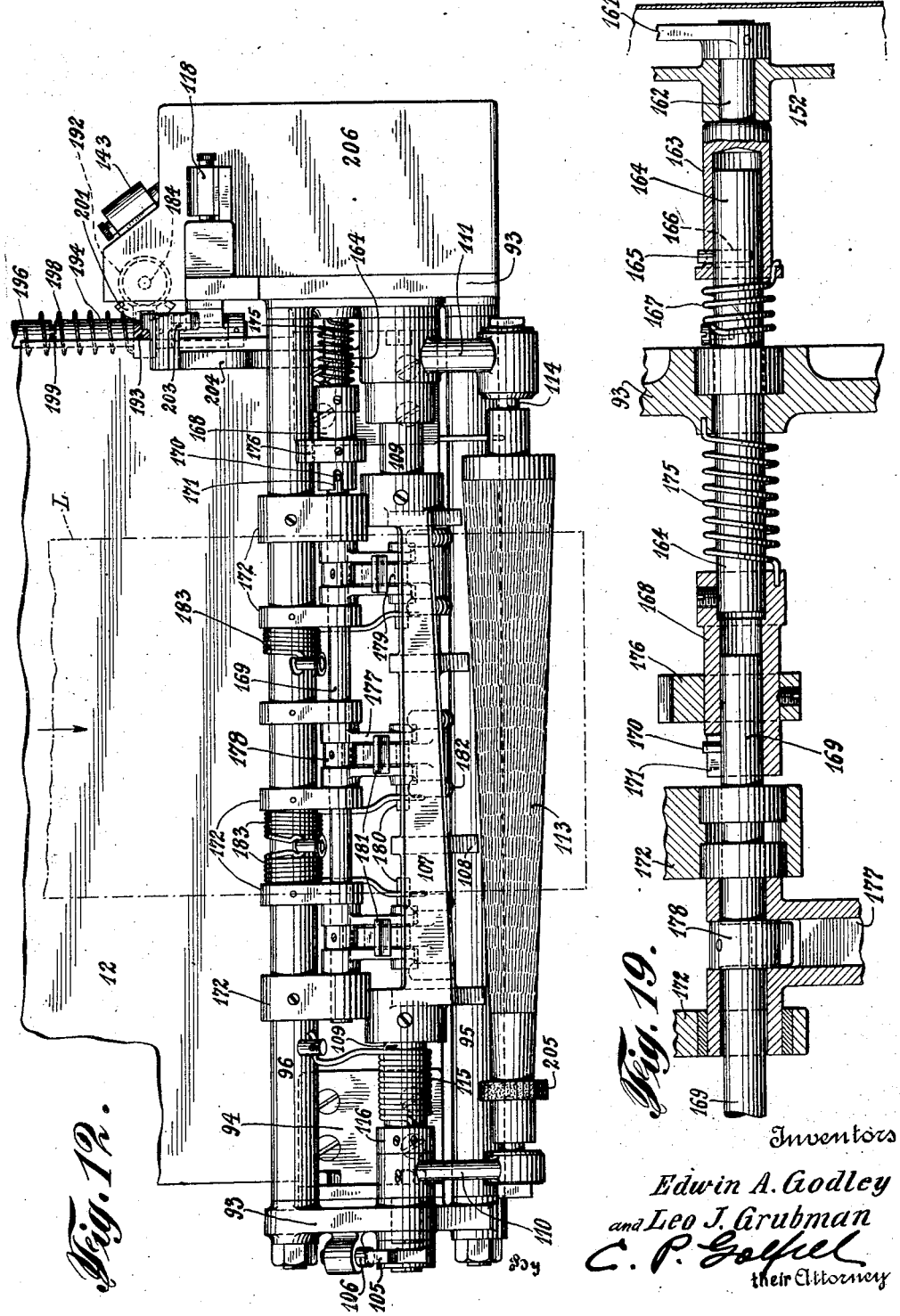

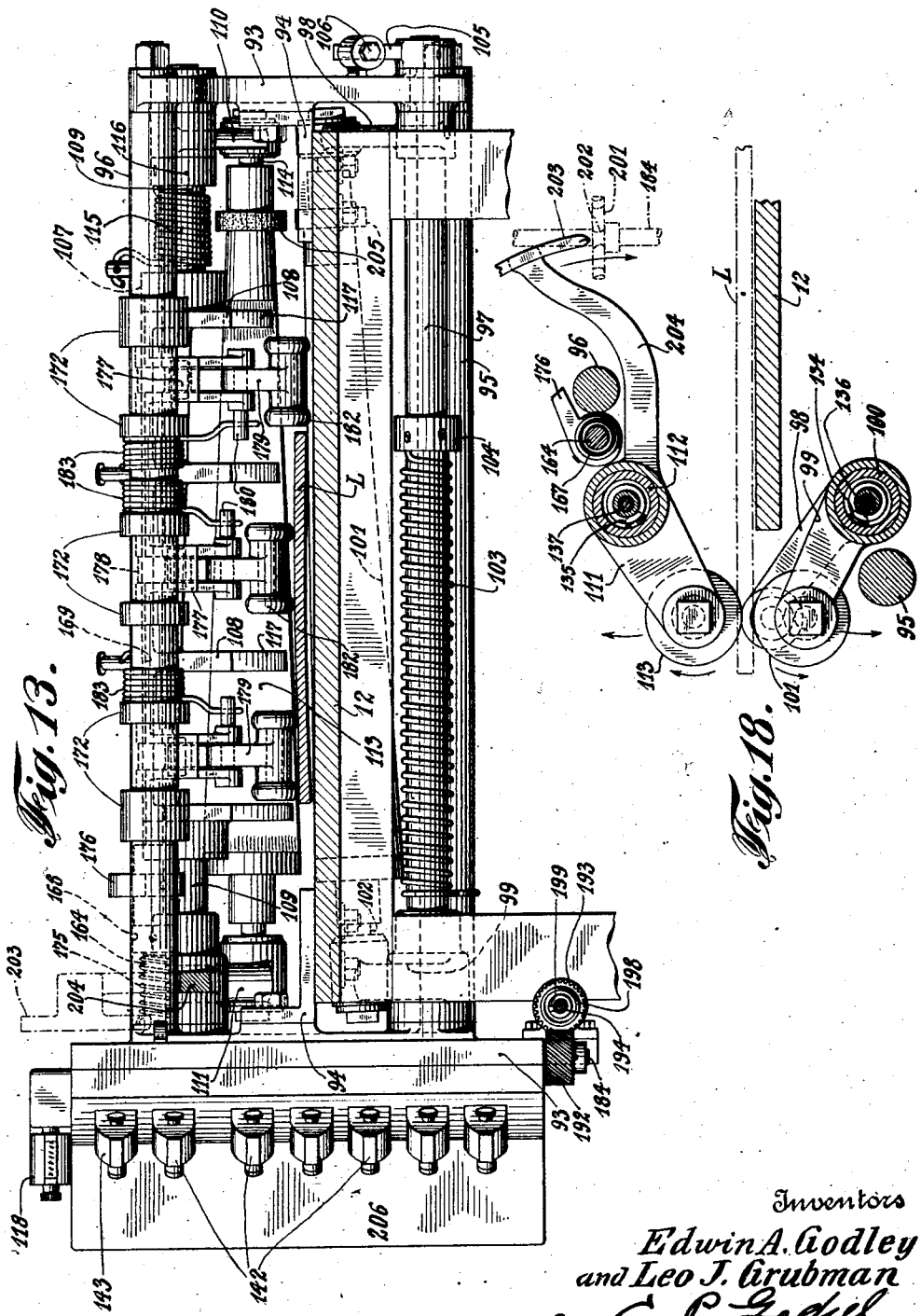

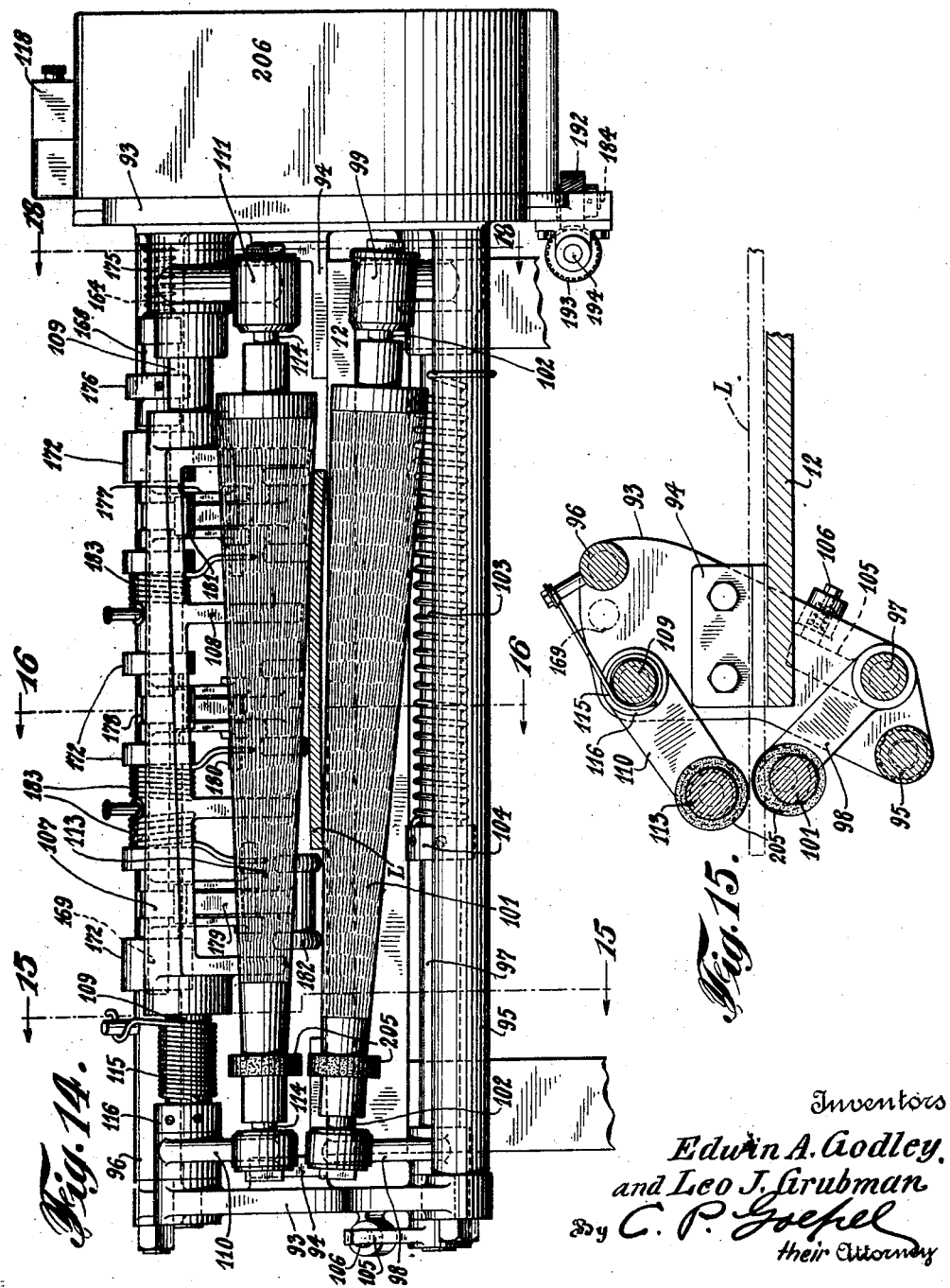

Dec. 13, 1927.  1,652,198
E. A. GODLEY ET AL
MACHINE FOR GRADING AND MEASURING LUMBER
Filed March 26, 1923    14 Sheets-Sheet 10

Inventors
Edwin A. Godley
and Leo J. Grubman
their Attorney

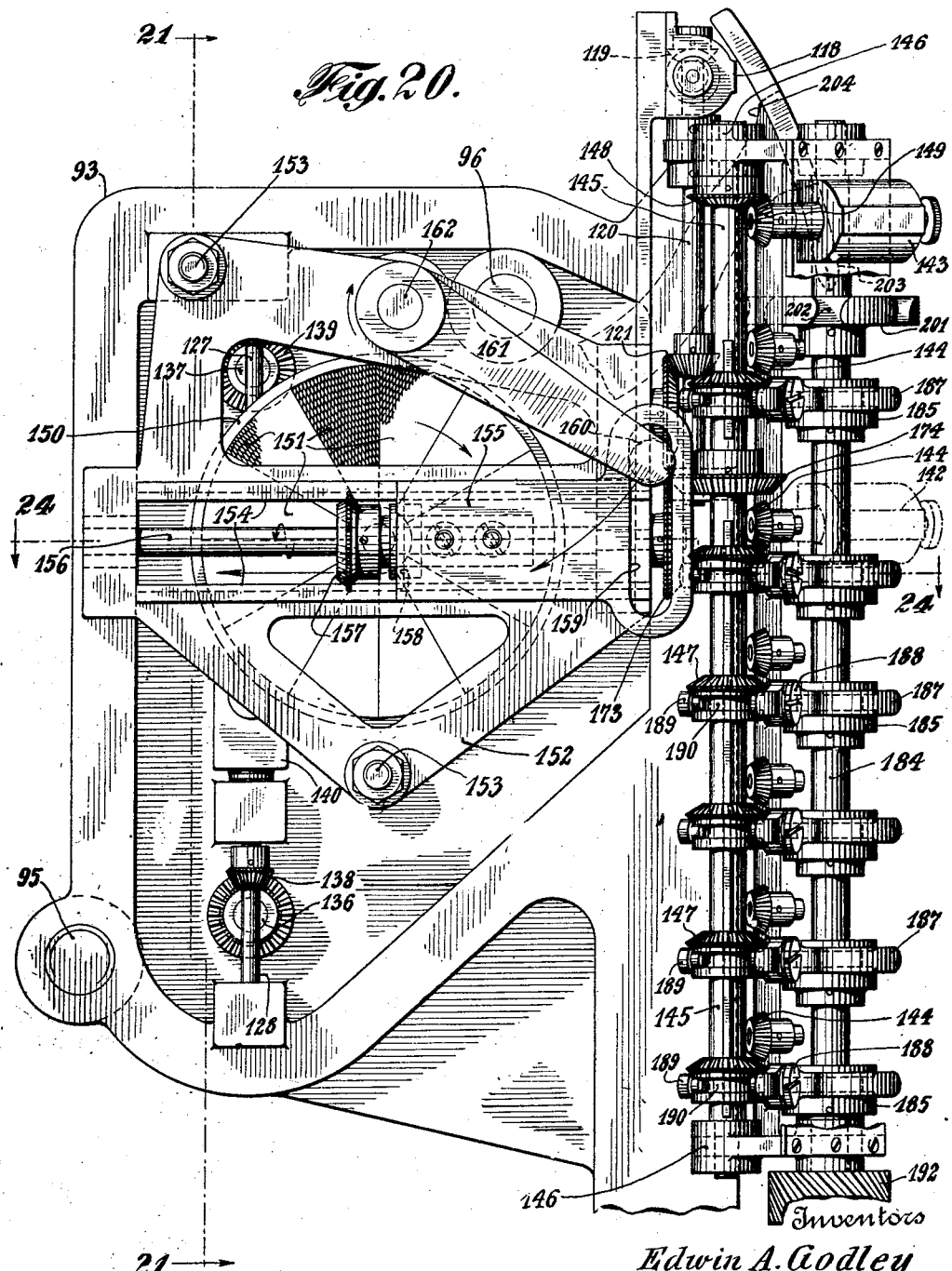

Dec. 13, 1927.  
E. A. GODLEY ET AL  
1,652,198  
MACHINE FOR GRADING AND MEASURING LUMBER  
Filed March 26, 1923    14 Sheets-Sheet 12
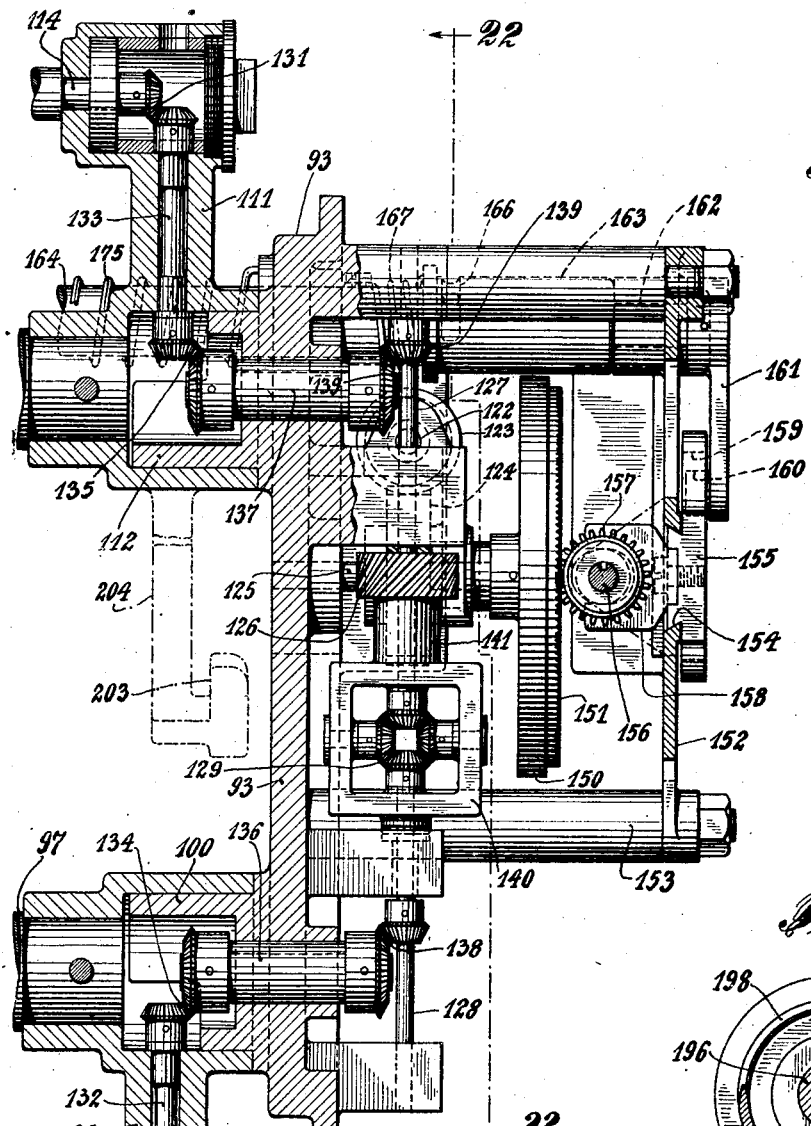
Fig.21.
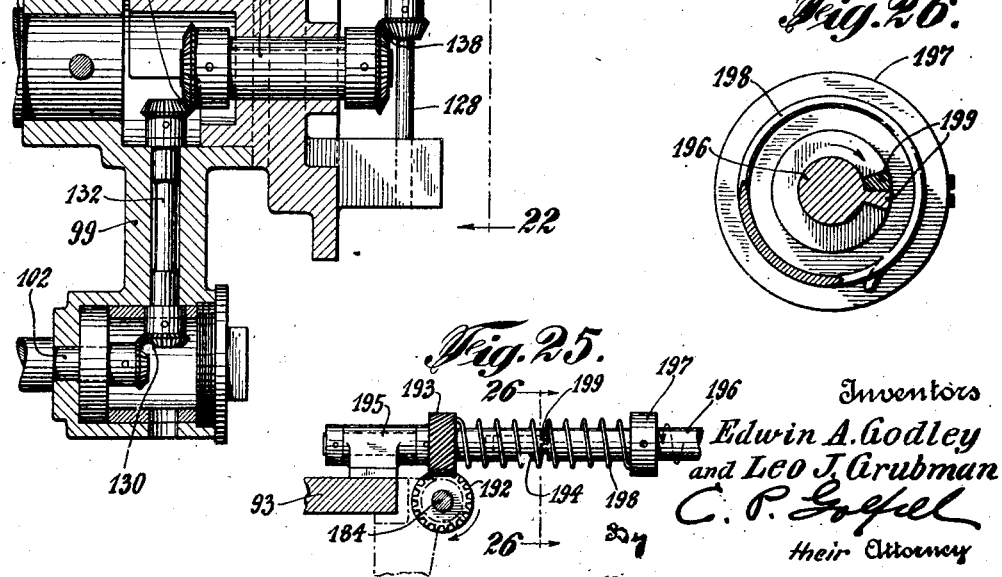
Fig.26.
Fig.25.
Inventors  
Edwin A. Godley  
and Leo J. Grubman  
C. P. Goffiel  
their Attorney

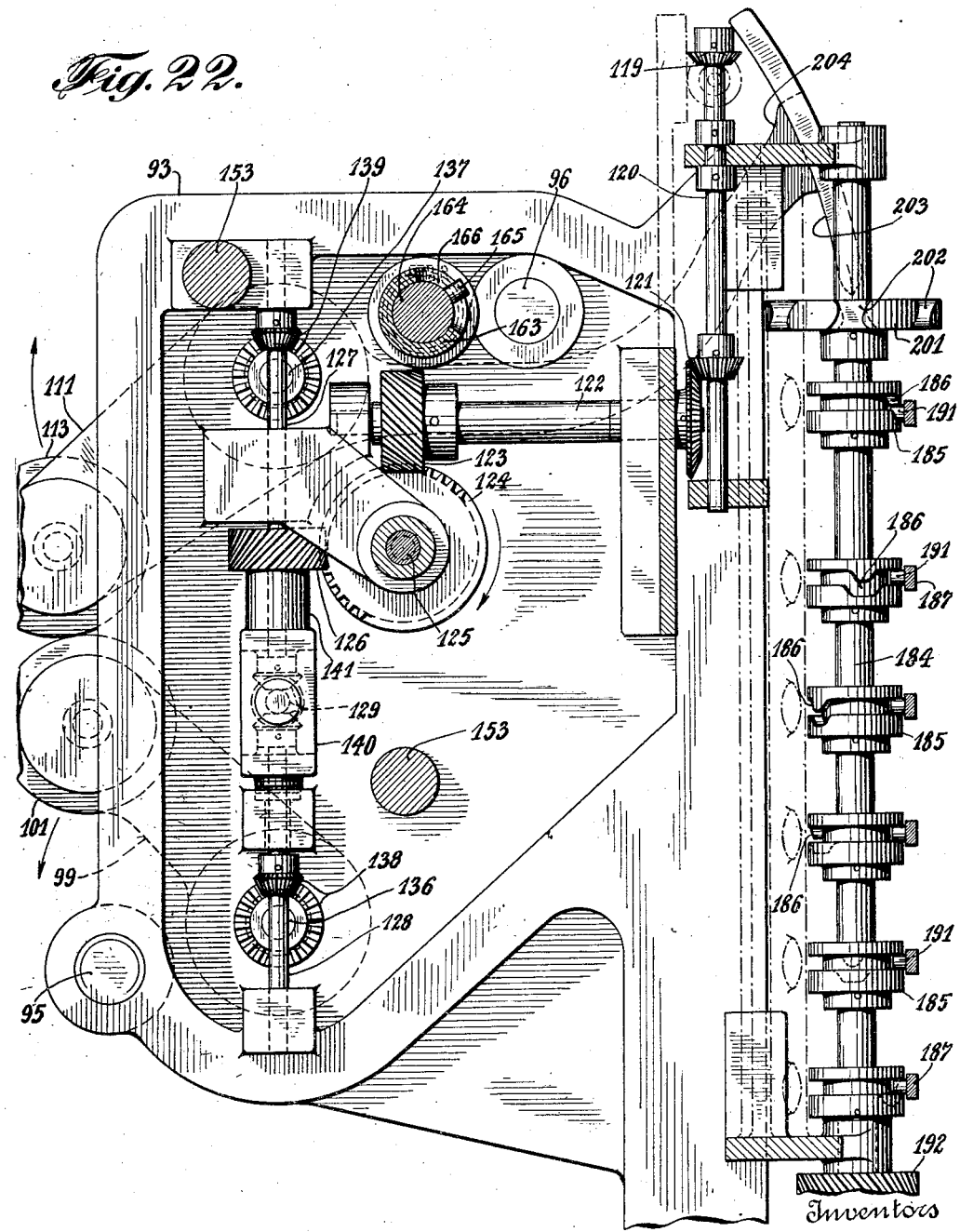

Dec. 13, 1927.
E. A. GODLEY ET AL
1,652,198
MACHINE FOR GRADING AND MEASURING LUMBER
Filed March 26, 1923   14 Sheets-Sheet 14
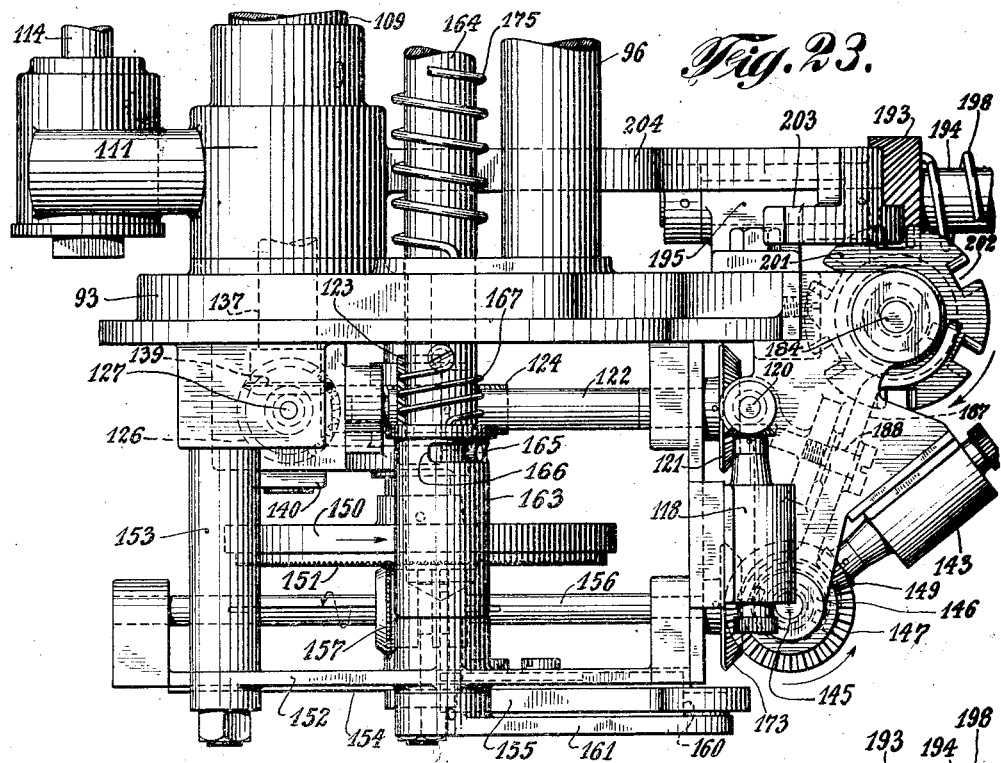
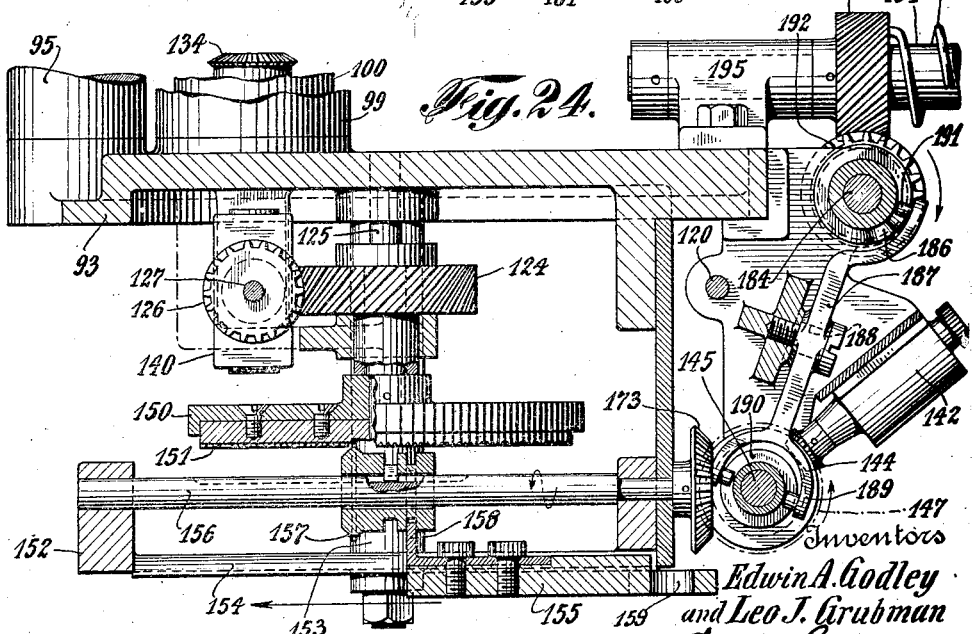
Inventors
Edwin A. Godley
and Leo J. Grubman
By C. P. Goepel
their Attorney Patented Dec. 13, 1927.

UNITED STATES PATENT OFFICE.

EDWIN A. GODLEY AND LEO J. GRUBMAN, OF NEW YORK, N. Y.

MACHINE FOR GRADING AND MEASURING LUMBER.

Application filed March 26, 1923. Serial No. 627,595.

This invention relates to a machine for grading and measuring lumber. As is well known, the lumber produced from different species of trees is graded as to quality, and in accordance with such grades, is employed for different purposes. These different grades of lumber bear distinguishing marks. In the larger lumber mills, the marking and measuring of the different grades of lumber is a time consuming and more or less laborious task. Obviously, therefore, the overhead expense is increased, resulting in a corresponding increase in the purchase price of such graded lumber to the consumer.

It is the primary object and purpose of our present invention to provide a mechanical means for stamping the proper grade mark upon the lumber and then subsequently automatically measuring each piece of lumber and producing a separate record of the board foot contents of all lumber of each grade. In addition to measuring each grade of lumber in terms indicative of its board foot or cubic measurement, we also provide additional automatic measuring means for obtaining the total surface area and board foot measurements of all grades of lumber passing through the machine.

In one contemplated embodiment of our invention, we may briefly refer to the machine as consisting of three units, namely, first the board manipulating mechanism which automatically manipulates or positions the board so that the grading expert may observe all parts thereof and thus correctly determine its grade; secondly, the marking or stamping mechanism which is under control of the grading expert and which automatically stamps or marks each piece of lumber with a numeral or other character denoting the grade thereof; and finally, the measuring mechanism which is automatically actuated by the board in the feeding movement of the latter and operates separate odometers upon which the surface measurement and the board feet contents of the board respectively, are registered. This automatic grade stamping and measuring mechanism may be conveniently arranged in advance of a planing machine to which the rough lumber is fed to be planed or dressed.

It is an additional object of our present invention to provide an automatic measuring mechanism of improved construction in which means is included for insuring an accurate measurement of the boards or lumber, even though the boards may be badly warped or of non-uniform thickness. Another important feature of the measuring mechanism consists in the provision of a series of separate odometers or integrating devices upon which the cubic measurement of the different grades of lumber is respectively registered, means for selectively rendering the odometers operative, and means automatically acting to lock the operating connections for the remaining odometers in the series and also prevent disconnection of the operative odometer from the measuring mechanism.

With the above and other objects in view, our invention consists in the improved lumber grading and measuring machine and in the form, construction and relative arrangement of the several parts thereof, as will be hereinafter more fully described, illustrated in the accompanying drawings and subsequently incorporated in the subjoined claims.

In the drawings wherein we have disclosed one practical embodiment of our invention and in which similar reference characters designate corresponding parts throughout the several views:

Figure 1 is a top plan view of the complete machine.

Figure 2 is a longitudinal section taken on the line 2—2 of Figure 1, the housings of the grade marking mechanism and the measuring mechanism being omitted;

Figure 3 is a top plan view with certain parts broken away of the grade marking mechanism;

Figure 4 is a side elevation thereof;

Figure 5 is a vertical section taken on the line 5—5 of Figure 4;

Figure 6 is an enlarged sectional view taken on the line 6—6 of Figure 7;

Figure 7 is a longitudinal section taken on the line 7—7 of Figure 6;

Figure 8 is a vertical section taken on the line 8—8 of Figure 5;

Figure 9 is a detail view illustrating the control means for the main shaft clutch of the marking mechanism;

Figure 10 is a sectional view taken on the line 10—10 of Figure 9;

Figure 11 is a fragmentary elevation of the control means;

Figure 12 is a plan view of the measuring mechanism;

Figure 13 is a front end elevation thereof;

Figure 14 is a rear end elevation of the measuring mechanism;

Figure 15 is a detail sectional view taken on the line 15—15 of Figure 14;

Figure 18 is a sectional view taken on the line 18—18 of Figure 14;

Figure 19 is an enlarged fragmentary longitudinal section showing the mounting of the actuating shaft for the shiftable pinion which controls the proper operation of the cubic measurement registering mechanism in accordance with the thickness of the board;

Figure 20 is a side elevation illustrating the operating mechanism for the several measurement registering odometers;

Figure 21 is a sectional view taken on the line 21—21 of Figure 20;

Figure 22 is a section taken on the line 22—22 of Figure 21;

Figure 23 is a plan view of said mechanism;

Figure 24 is a horizontal section taken on the line 24—24 of Figure 20;

Figure 25 is a detail view illustrating the flexible operating connection between the main shaft of the grade marking mechanism and the means for operatively connecting the selective grade measuring odometers with the measuring mechanism; and Figure 26 is an enlarged sectional view taken on the line 26—26 of Figure 25.

Figure 16:
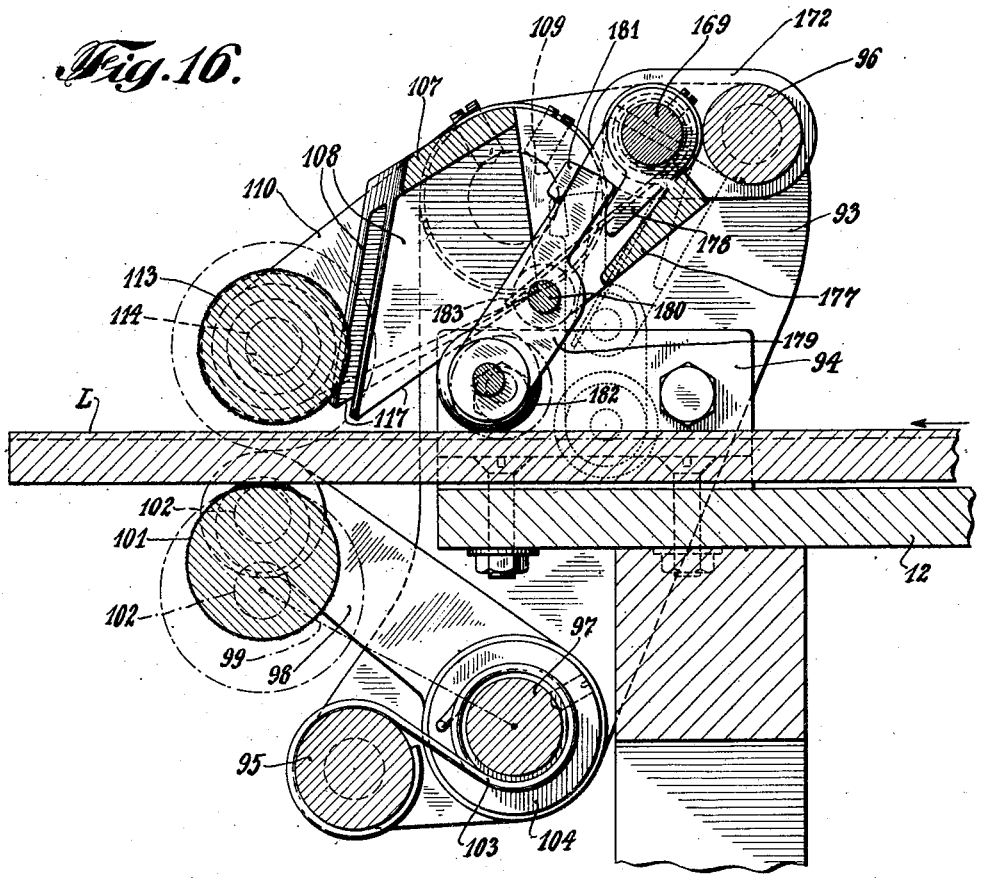
Figure 16 is a similar view taken on the line 16—16 of Figure 14.

For convenience of description, we may refer to the machine as comprising three distinct units, so associated and arranged with respect to each other that the grading and measuring of each piece of lumber or board is carried out in a continuous and uninterrupted operation. The first of these units, generally designated A in the drawings, is a board manipulating and feeding table. As herein shown this table consists of similar parallel side frame members 5 in which a plurality of spaced parallel transversely positioned rollers 6 are suitably journaled at their ends. The roller shafts at one of their ends are extended beyond the frame member 5 and provided with suitable sprockets for engagement by the drive chain 7. Rotation is imparted to one of the end rollers through a suitable driving connection 8 from any convenient source of power, and through the medium of the chain 7 the remaining rollers are positively driven or rotated in the same direction and at the same speed.

Upon one of the side frames 5 and spaced above the same, a longitudinally extending guide rail 9 is suitably supported. This rail extends from one end of the table and terminates in an inwardly curved finger 10 at a point in spaced relation to the opposite end of the table. Those feed rollers 6 for the longitudinal extent of the rail 9 are provided at one of their ends and adjacent to the inner side of said rail with the circumferential grooves 11. The lumber or board, as indicated at L in Figure 2, is placed upon the feeding rollers in edgewise position with the lower longitudinal edge of the board engaged in the grooves 11. As these rollers rotate, the board is longitudinally fed with its outer side in contact with the rail 9. As the end of the board strikes the inwardly curved finger 10 of said rail, the board is turned inwardly so that it falls downwardly to a horizontal position upon the feed rollers 6, the feeding movement being then continued with the board in this position. It will thus be apparent that a grading expert stationed at one side of the feed table will first observe one side of the board as it is moved longitudinally by the feed rollers in the position seen in Figure 2, and then when the board is disposed in a horizontal position on the rollers as above explained, he can readily observe the opposite side thereof. Thus the board can be carefully inspected, its imperfections noted and its proper grade determined accordingly.

This lumber manipulating means, above described, is not herein claimed, since it forms the subject matter of our divisional application for patent, filed May 9, 1924, Serial No. 711,974.

The second unit of the machine is the grade marking mechanism B, of which we shall first describe the mechanical construction, and then subsequently explain the operation thereof. In connection with this part of the machine, reference is to be had more particularly to Figures 3 to 11, inclusive of the drawings.

The grade marking mechanism is mounted upon a suitable supporting structure having a board receiving plate or table 12. Below this table the transverse power shaft 13 is suitably mounted and carries one or more feeding wheels 14 which at their upper portions are engaged in suitable openings 15 in the table 12 and are adapted to engage with the underside of the board as it is fed longitudinally over said table by the rollers 6, in order to positively continue without interruption the longitudinal movement of the board over the surface of the table 12.

In suitable bearings 16 at one end of the table 12, the ends of a shaft 17 are journaled. Upon this shaft at its opposite ends the horizontally disposed arms 19 of a frame 18 are loosely mounted for rocking movement. At the other ends of said arms, the frame parts have upwardly and downwardly extending portions and intermediate of their ends are formed with suitable bearings 20 to receive the opposite ends of a sleeve 21 through which the main shaft 22 is loosely engaged. To one end of this shaft the gear 23 is fixed, said gear meshing with a relatively smaller gear 4 on one end of a countershaft 25 which is rotatably supported in the frame arms 19.

Upon the sleeve 21, a number of wheels 26 are loosely mounted for free rotation and are adapted to engage the upper surface of the board and thus hold the same in close contact with the peripheral surfaces of the feed rollers 14. Normally, when the board is not engaged between the rollers 14 and 26, said rollers are in close relation to each other. The frame 18 is yieldingly sustained by means of the coil springs 27 which are engaged in sockets or recesses 28 and 29 formed in the frame parts and in the opposite edges of the table 12 respectively.

Upon the sleeve 21 spaced gears 30 are fixedly mounted by means of keys 31ª. One face of each of these gears is recessed to receive the cam member 31 which is keyed to the sleeve 21 for rotation therewith. This face of each gear 30 is also provided with radially extending recesses or channels 32 communicating with the recess in which the cam 31 is positioned. A type bar 33 is longitudinally movable in each of these channels and is normally pressed inwardly by means of a coil spring 34 which yieldingly holds the inner end of the type bar in engagement with the periphery of the cam member 31. The springs 34 may be conveniently located in the channels 32 within slots 35 formed in the type bars, said springs bearing at one of their ends against the inner end walls of the slots and at their outer ends against the lugs 36 which are formed upon the gear member 30. The movable type bars 33 are retained within the radial channels of the gear member by means of the cover plate 37 which is fixed to the face of the gear by suitable screws 38. In the illustrated embodiment of the invention we have shown six of the radially movable type bars 33. These bars are provided on their outer end faces with numerals, letters or other distinguishing characters denoting the different grades of lumber. In the present instance we may consider these bars as provided with the type numerals 1, 2, 3, 4, 5 and 6 respectively.

A pair of spaced arms 39 are also keyed or otherwise fixed to the sleeve 21 in the same radial relation to the shaft 22. Rotation of the sleeve 21 relative to the shaft 22 and consequently the movement of said arms in one direction is resisted by a contractile spring 40 which is suitably connected to a collar 41 which is keyed upon one end of the sleeve. This collar carries a pawl 42 which is yieldingly urged outwardly beyond the periphery of the collar by the spring 43 and into engagement with the internal teeth 44 of a double ratchet 45 which is suitably fixed upon the inner side of the gear 23 secured upon the end of the shaft 22. The external teeth 46 of this ratchet which extend in the same direction as the internal teeth 44, are engaged by a second pawl or dog 47 suitably mounted upon the frame part 18 beneath said ratchet and pressed upwardly into engagement with the ratchet teeth by the spring 48.

Below the sleeve 21 the collar 41 is formed with a slot 49 in which a bar 50 is movably engaged. The lower end of this bar is provided with studs 51 and 52 respectively, projecting in opposite directions therefrom. The bar is yieldingly urged inwardly in the slot 49 by means of the leaf spring 53 whereby the stud 51 is held in position for engagement by circumferentially spaced cam lugs 54 formed upon the ratchet 45 at one side of the external teeth 46 thereof. It is also to be noted that the pawl or dog 47 is of such width that it not only engages the teeth 46 of the ratchet but is also disposed in the path of movement of the outer end of the bar 50 and thus acts to limit the turning or rotative movement of the sleeve 21, levers 39 and cams 31 under the contractile action of the spring 40. The other stud 52 on the bar 50 is adapted for engagement with a cam 55 which is fixed to the frame part 18, the coaction of the stud with said cam projecting the bar 50 outwardly from the slot 49 in collar 41 so as to position the other stud 51 for engagement by one of the cam lugs 54, as will hereinafter be more fully explained. Each of the arms or levers 39 carries a roller 56 at its outer end with which the board is adapted to engage as it is fed through the machine, as will be readily understood from reference to Figure 2 of the drawings.

The shaft 13 is driven from a motor or other convenient power source by the drive belt 57 or other equivalent driving connection with one end of said shaft. The other end of the shaft 13 is connected by a sprocket and chain drive 58 to one end of the shaft 17. Upon this end of said shaft a gear 59 is fixed and meshes with a gear 60 loosely mounted upon the main shaft 22. This gear is formed with a recessed hub 61, the wall of which is provided at its outer end with an internal lug or tooth 62 adapted for engagement by a tooth 64 formed upon the periphery of a clutch member 63 which is keyed upon the end of the shaft 22 for sliding movement.

Upon the end of shaft 22 a disc 65 is loosely mounted. One face of this disc is provided with a cam lug 66, the opposed face of the clutch member 63 having a similar cam lug 67. These lugs are disposed at the same radial distance from the axis of shaft 22 and have obliquely inclined cam faces 68 and 69 respectively. A coil spring 70 has one of its ends fixed to the clutch member 63 and the other end thereof fixed to the disc 65. This spring by its contractile action tends to normally hold the clutch member in position on the shaft 22 with its tooth 64 disposed in the path of movement of the tooth 62 of the gear 60 and to also dispose the cam lug 67 of the clutch member in the same circumferential path as the cam lug 66 on the disc 65. Upon a suitable supporting bracket 71 a casing or housing 72 is mounted. Upon the pivot rod 73 within this housing a plurality of levers 74 are loosely engaged, said levers corresponding in number to the number of type bars 33 carried by each of the gears 30. Each lever 74 has an operating finger 75 extending outwardly through an opening in one wall of the housing 72. The inner side of the housing which is opposed to the disc 65 may remain open, or if closed, the inner wall thereof is likewise provided with suitable openings through which stop lugs 76 formed upon the upper ends of the levers may project. Said levers are urged to normal position by means of the leaf springs 77.

Above the series of levers 74 a fixed shaft 78 is mounted in spaced brackets 79 and upon this shaft a sleeve 80 is loosely engaged, the lower side of said sleeve being formed with a longitudinally extending locking rib 81. One or more springs 82 act to yieldingly resist rotation of the sleeve 80 and to normally hold the locking rib 81 in contact with stop pins 83 on the brackets 79. Each lever 74 is additionally provided with an upwardly projecting lug 84 to coact with the locking rib 81 in a manner to be subsequently explained. The levers 74 are adapted to be manually actuated, and when pressed inwardly by the application of the finger to the part 75, a selected lever may be disposed with its stop lug 76 located in the circumferential line of movement of one of the lugs 85 which projects from the outer face of the disc 65. These lugs which likewise correspond in number with the number of levers 74 and the type bars 33, are disposed at relatively different distances from the axial center of said disc. It is of course, understood that the lugs 76 of the levers are located at relatively different points with respect to the axis of the disc so that they will properly coincide with the path of movement of the respective lugs 85.

If desired, the selective operation of the levers 74 may also be electrically controlled in the manner indicated in Figures 9 and 11 of the drawings. For this purpose, we provide an electromagnet 86 for each lever having its core rod 87 operatively connected to the lower end of the lever 74, as at 88. Adjacent to the position of the expert observer at one side of the table 5, a switch box 89 is suitably arranged containing switches 90 of any suitable type, corresponding in number to the number of the levers 74. Thus by closing the proper switch, the magnet 86 will be energized to operate the selected lever.

Upon reference to Figure 8 of the drawings, it will be seen that only one of the type bars 33 carried by each of the gears 30 is engaged with the cam face 31$^a$ of the member 31, the remainder of the type bars being in projected position with their type bearing faces projecting slightly beyond the peripheral faces of the loosely mounted rollers 26. Rotation is positively transmitted to the gears 30 through the medium of spaced pinions 91 fixed upon the countershaft 25. The type faces of the bars 33 are supplied with ink from the inking rollers 92 which are rotatably mounted between the upper ends of the frame members 18 and extend longitudinally above the rollers 26.

In the operation of the grade marking or stamping mechanism above described, assuming that the arms 39 are in their normal positions, as shown in dotted lines in Fig. 6 of the drawings, and stud 51 on the bar 50 is engaged beneath one of the cam lugs 54 of the ratchet 45 while the other lug 52 on said bar is disposed beneath the cam 55, after the observer has noted the grade of the board as it is fed to the machine, he operates the proper lever 74 or closes the proper switch 90 so that the stop lug 76 of the lever is positioned in the path of movement of the corresponding lug 85 on the disc 65. Upon rotating the power shaft 13 and thereby transmitting rotation through gears 59 and 60 and the clutch member 63 to the main shaft 22, the gear 23 is rotated in the direction indicated by the arrow in Figure 5 of the drawings, thereby transmitting rotation to the countershaft 25 and through the pinions 91 rotating the gears 30 relative to the sleeve 21. This sleeve and the collar 41 fitted thereon remain stationary while the ratchet 45 fixed to the gear 23 rotates with respect thereto. However, since the stud 52 is engaged with the outer end of the cam 55, the bar 50 will be retained in its projected position after the cam lug 54 on the ratchet moves out of engagement with the pin 51. In this rotation of the main shaft 22 and the clutch member 63 thereon, rotation is also imparted to disc 65 through the medium of the connecting spring 70 between said disc and the clutch member.

When the lever 74 was actuated, the lug 84 thereon engaged the rib 81 of the sleeve 80 and locked said sleeve against the action of the springs 82 until the locking rib engaged behind the lug 84, thus holding said lever against the action of spring 77 with its stop finger 76 disposed in the path of movement of one of the lugs 85. Thus, when this lug strikes said stop finger, the disc 65 is held against further rotation and the cam face 69 of the lug 67 on the shiftable clutch member 63 engaging the complementary cam 68 of the lug 66 on said disc operates to move the clutch member 63 axially of the shaft against the contractile action of spring 70 and disengage the tooth 64 of said clutch member from the tooth 62 on the gear 60, thus disconnecting the main shaft from the operating gearing so that the rotation of the gears 30 carrying the marking type is brought to a stop when the type bar 33 bearing the character corresponding to the lever 74 which was actuated and denoting the grade of the board, is positioned immediately above the board at the rear side of the arm or lever 39, as shown in Figure 8 of the drawings. During the slight further rotation of shaft 22, while the cam lugs 66 and 67 are acting to disengage the clutch 63 from gear 60, the spring 70 will be placed under torsional stress so that it will have a tendency to turn the disc 65 on the end of shaft 22 and hold the lug 85 thereof in bearing contact with the finger 76 of the lever.

As the board is fed beneath the rollers 26, the end of the board strikes the rollers 56 on the lower ends of the arms 39 and moves said arms from the dotted line position shown in Fig. 6 to the full line position. These arms being fixed to the sleeve 21 and said sleeve being connected to the ratchet 45 through the medium of the pawl 42, it will be understood that in this movement of said arms the collar 41, ratchet 45, gear 23 and the gears 30 all move as a unit therewith. In this movement of the arms sufficient rotation is imparted to the gears 30 to cause the previously positioned type bars 33 bearing the proper grade mark to imprint or stamp said mark at spaced points on the surface of the board at its end. As the bar 50 moves with the collar 41 and is held in projected position by one of the cam lugs 54 on ratchet 45, the outer end of this bar passing behind the upwardly pressed dog 47, as in Figure 6 of the drawings, holds the arms 39 and the parts actuated thereby against return movement after the board has passed outwardly beyond the rollers 26 and the type carrying gears.

The type carrying gears can, however, be operated independently of the arms 39 to reset the same and dispose another type bar in proper position for printing while the board still remains beneath the rollers 26. Referring again to Figure 8 of the drawings, it will be noted that when the marking means is actuated by the board, as above described, the cam faces 31ª of the cam members 31 are moved from the full line positions to the dotted line positions, or in other words, to a position below the shaft 22.

Therefore, it will be apparent that in any further rotation of the gear 30 in the direction indicated by the arrow, the type bars 33 will be successively pressed inwardly against the cam faces 31ª as the outer ends of said type bars approach the board so that the type faces will not engage with and imprint their marks on the surface of the board which has already been marked with the proper grade character. Therefore, the observer may note the grade of a second board being fed over the table 5 while the previous board is still passing beneath the marking mechanism. If this board is of a different grade, another of the switches 90 is closed or another lever 74 manually actuated. As the lug 84 of said lever engages the convex side face 81ª of the rib 81 on sleeve 80, it moves said rib upwardly above the lug 84 of the lever 74 which was previously actuated, thereby releasing said lever so that it is returned to its normal position by spring 77. The lug 84 on the second lever 74 then passes to the opposite side of the rib 81 permitting of the return of sleeve 80 to its normal position whereby this latter lever is locked against return movement with its finger 76 positioned in the path of movement of another of the lugs 85 on disc 65. As the disc 65 is thus released from the holding action of the finger 76 on the lever which was first actuated, the spring 70 by its torsional action moves the disc 65 relative to shaft 22 and by its contractile action shifts the clutch member 63 on said shaft to again engage its tooth 64 with the tooth 62 of the gear 60. It will be understood that the cam lugs 66 and 67 remain in sliding contact with each other. Therefore, positive rotation is again transmitted to the shaft 22 and through said shaft to the marker carrying gears 30, as above explained, to properly position another of the type bars carried by said gears so that the next board fed through the marking mechanism will be marked with the proper characters when it engages and actuates the arms 39, which it will be understood, return to their normal positions as soon as the first board has passed beyond the marking mechanism.

Such return movement of the arms is permitted owing to the fact that in the resetting of the marking mechanism, the cam lug 54 which was engaged with the stud 51 is disengaged therefrom so that bar 50 is moved inwardly by the spring 53. Thus, after the board is disengaged from the rollers 56, the spring 40 may contract to return the arms to their normal position, it being understood that in such movement, the sleeve and collar rotate relative to the shaft 22 while the pawl 42 is engaged with another of the internal teeth in the ratchet 45. Thus it will be seen that the markers may be selectively positioned so as to imprint the proper grade mark or character upon the board when a further automatic movement is imparted to the marking mechanism by the feeding of the board therethrough.

We do not herein claim the above described grade marking mechanism per se, as it forms the subject matter of a second divisional application, filed May 9, 1924, Serial No. 711,973.

After the board has been marked or stamped with the character denoting its grade or quality, the surface and cubic measurements of each board are automatically registered upon odometers or other suitable integrating devices. We have illustrated and described a measuring mechanism for this purpose in our pending application filed September 23rd, 1921, Serial No. 502,620. The operating principle whereby the measurements of the board are automatically registered is the same in the present instance as that involved in our pending application. However, we have made certain very important improvements in the former mechanism in the interest of greater accuracy and have provided means for selectively registering the measurements of boards of different grades upon individual odometers. This measuring mechanism C, we shall now proceed to describe in detail.

Upon one end of the bed plate or table 12 at the opposite edges thereof, bearing plates 93 are suitably mounted and supported, as upon the brackets 94. These plates are connected to each other by tie-rods 95 and 96 respectively.

Between the lower ends of the plates 93 a shaft 97 is rotatably supported. To opposite ends of this shaft the arms 98 and 99 respectively, are fixed. The arm 99 is of hollow construction for a purpose which will be presently referred to and is rotatably engaged upon a bearing projection 100 on the frame plate 93, the shaft 97 terminating in said arm which constitutes a rotatable support therefor, as will be seen from reference to Figure 21 of the drawings. The other arm 98 which is of solid construction, is fixed upon the shaft 97, the outer end of said shaft being directly journaled in the other frame plate 93. These arms 98 and 99 support the lower tapered measuring roller 101, the peripheral surface of which is knurled or finely corrugated. The measuring roller is provided at its ends with shaft extensions 102 which are rotatably journaled in the ends of the supporting arms. The shaft 97 is encircled for a portion of its length by a torsional coil spring 103, one end of which is fixed in a collar 104 pinned on said shaft while the other end of said spring is suitably secured to the tie-rod 95. This spring normally acts to rotate shaft 97 in one direction and urge the arms 98 and 99 carrying the measuring roller 101 upwardly to normal position. One end of the shaft 97 carries a finger 105 adapted to engage an adjustable stop 106 on the frame plate 93 to limit this upward movement of the measuring roller under the action of spring 103. It is to be observed that the arms 98 and 99 are disposed in such relative angular radial positions with relation to the shaft 97 that the axis of the measuring roller 101 is positioned at an inclination relative to the transverse dimension of the horizontal table or bed plate 12.

In advance of the measuring rollers a guard member 107 is arranged. This member is in the form of a metal casting having a plurality of depending flanges 108 and is provided at its opposite ends with the shaft extensions 109 which are rotatably supported between the upper ends of the frame plates 93. To each of these shaft extensions an arm 110 and 111 respectively, is fixed. These arms correspond in form and construction to the arms 98 and 99 previously referred to, the arm 111 being hollow and mounted at one of its ends upon the bearing extension 112 on the frame plate 93. Between the ends of these arms the upper measuring roller 113 is supported. This roller is of similar tapering form and has the same knurled or corrugated peripheral surface as the lower roller 101, the shaft extensions 114 at the ends of the upper roller being suitably journaled in the arms 110 and 111. Upon one of the shaft extensions 109 of the guard member 107, a torsional coil spring 115 is arranged having one end thereof secured to the collar 116 fixed on the shaft extension and the other end thereof suitably attached to the tierod 96. This spring is normally contracted around the shaft extension 109 and holds the guard member 107 in an elevated position and against gravity swinging movement, where it will be observed that the lower edges of the flanges 108 are obliquely inclined upwardly as at 117 in a direction opposite to that in which the board is moving over the bed plate 12. The rear ends of these inclined edges 117 are disposed closely adjacent to the periphery of the upper measuring roller 113 and substantially in the plane of its lower surface. Thus it will be apparent that since the roller supporting arms are fixed to the shaft extensions 109 of the guard member, when the forward end edge of the board strikes the inclined edges 117 of the flanges 108, said guard, together with the upper roller 113, will be raised so as to expand or uncoil the spring 115 and the end edge of the board will not contact with the peripheral surface of said roller and the rotation of said roller will not be started by frictional contact with the board until said end edge of the board is disposed exactly in vertical alignment with the axis of the measuring roller. The possibility of false or inaccurate measurement is in this manner to a large extent, obviated.

As fully explained in our co-pending application, a board moving in the direction of its length between the two rollers 101 and 113 will contact at its opposite longitudinal edges with portions of said rollers which are of relatively different diameters and therefore, the rollers will be rotated at different rotative speeds. The difference in such rotative speeds of the rollers will of course vary in accordance with the width of the board and each roller will make a certain predetermined number of revolutions in each foot of linear movement of the board for each point of contact of the edge of the board upon the peripheral surface of the roller. These differing rotative speeds of the measuring rollers are compensated to each roller and the mean thereof is transferred to an odometer in terms indicative of the square surface measurement of the board. As shown in the accompanying drawings, the odometer 118 for recording the surface measurement is suitably mounted upon the upper end of one of the frame castings 93, the shaft thereof being geared as at 119 to a vertical shaft 120. This shaft in turn is operatively connected by the gearing 121 to the horizontal shaft 122 which carries a spiral gear 123 meshing with a similar gear 124 on the shaft 125. This latter gear is engaged with the spiral gear 126. A vertical shaft 127 is axially aligned with a second vertical shaft 128, said shafts being connected to each other by the compensating gearing 129.

In Figure 21 of the drawings we have shown the hollow roller supporting arms 99 and 111 disposed out of their proper operative positions in order to more clearly illustrate the mechanism. Upon reference to this view, it will be noted that the roller shafts 102 and 114 extend into the hollow ends of the respective supporting arms and are connected by the beveled gearing 130 and 131 respectively to the rotation transmitting shafts 132 and 133 which are rotatably mounted in the supporting arms and extend axially therethrough. These shafts at their other or inner ends are connected by the gearing 134 and 135, respectively, with horizontal shafts 136 and 137 suitably journaled in the frame plate 93. The other ends of the latter shafts are operatively connected by the gearing 138 and 139 respectively, with the vertically aligned shafts 128 and 127. The differential or compensating gear 129 above referred to is of the conventional type having the yoke or frame 140 in which diametrically opposed gears are mounted meshing with gear elements on the opposed ends of the shafts 127 and 128. The gear frame is provided with a hub or sleeve 141 through which the shaft 127 extends and to which the gear 126 meshing with gear 124 is fixed. Thus it will be apparent that through the compensating or differential gear the differential rotative movements of the shafts 127 and 128 are compensated with respect to each other and the mean surface travel of the two measuring rollers 101 and 113 is transmitted by the gearing 121, 123, 124 and 126 to the vertical shaft 120 which operates the odometer 118 to accurately register thereon the square surface area of each board passing between the two measuring rollers.

In addition to thus automatically registering the surface measurement of all boards passing through the machine, we also provide means for automatically registering the cubic or board foot contents of each grade of lumber separately and also, the total cubic contents of all boards passing through the machine. To this end there is suitably mounted upon the frame plate 93 a series of vertically spaced odometers 142 which correspond in number to the number of different grades of lumber, and above this series of odometers an additional totalizing odometer 143 is mounted upon which is registered the combined cubic contents of all grades of lumber. As will be hereinafter described, we provide means for automatically connecting the proper odometer 142 with the measuring mechanism to be actuated thereby in accordance with the particular grade of lumber which may at the time be passing between the measuring rollers. The shaft of each of the odometers 142 is provided with a beveled pinion 144. Upon a vertically disposed shaft 145 journaled at its opposite ends in suitable bearings 146, a series of beveled gears 147 are keyed for axial sliding movement and are normally out of meshing engagement with the respective pinions 144. An additional beveled gear 148 is fixed to the shaft 145 and meshes with the pinion 149 on the shaft of the totalizing odometer 143. The shaft 145 is actuated through the medium of the gearing shown more particularly in Figures 20, 21 and 24. Upon reference to these Figures, it will be observed that a gear plate 150 is fixed upon the shaft 125. The face of this plate consists of a plurality of segmental areas whose surfaces are milled to provide pyramidal shaped teeth indicated at 151. In spaced relation to the frame plate 93, the skeletonized frame plate 152 is arranged and rigidly supported in parallel relation to the frame plate by the tie-rods 153 or in any other convenient manner. The central portion of this plate is provided with a guide-way 154 in which a slide 155 is mounted. At the inner side of the plate 152 a horizontally disposed shaft 156 is journaled at its ends in suitable bearings and upon this shaft the pinion 157 is keyed for sliding movement. This pinion is of special construction having oppositely beveled faces at the apex of which pyramidal shaped teeth are formed to engage the correspondingly shaped teeth 151 on the face of the gear plate 150. The pinion 157 has a peripherally grooved sleeve to receive the arms of a yoke 158 carried by the slide 155. The other end of this slide has a vertically extending slot 159 which receives a roller 160 on the end of an arm 161 which is fixed at its other end to the shaft 162 which is rotatably mounted in the plate 152. This shaft is integrally formed with a sleeve 163 which receives one end of a second shaft 164 journaled in the frame plate 93. A pin 165 fixed in the shaft 164 is engaged in a circumferential slot 166 in the wall of the sleeve 163 and is yieldingly held by means of a spring 167 connected to the shaft and to the sleeve in engagement with one end wall of said slot. The other end of the shaft 164 is fixed in one end of a sleeve 168, said sleeve receiving the end of a shaft 169, and being connected therewith for unitary rotation by a pin 170 in said shaft engaging in a longitudinal slot 171 in the end of the sleeve. The shaft 169 is rotatably supported in the spaced bearing arms 172 fixed to the rod 96.

To one end of the shaft 156 a beveled gear 173 is fixed and meshes with a similar gear 174 secured upon the vertical shaft 145. It will be understood from the above description that the position of the pinion 157 with respect to the axis of rotation of the gear plate 150 determines the speed of rotation of the shaft 156 and consequently of the vertical shaft 145. Since this pinion is shifted by the swinging movement of the arm 161, it will be seen that the position of the pinion upon the face of the gear plate is primarily controlled by rotation of the shaft 169. This shaft is yieldingly held in a normal position by means of a torsional coil spring 175 surrounding the shaft 164 and fixed at its extremities to the frame plate 93 and the sleeve 168, respectively. Such rotation of the shaft under the action of said spring is limited by means of the stop finger 176 fixed on the sleeve 168 which is adapted to engage the rod 96.

Figure 17:
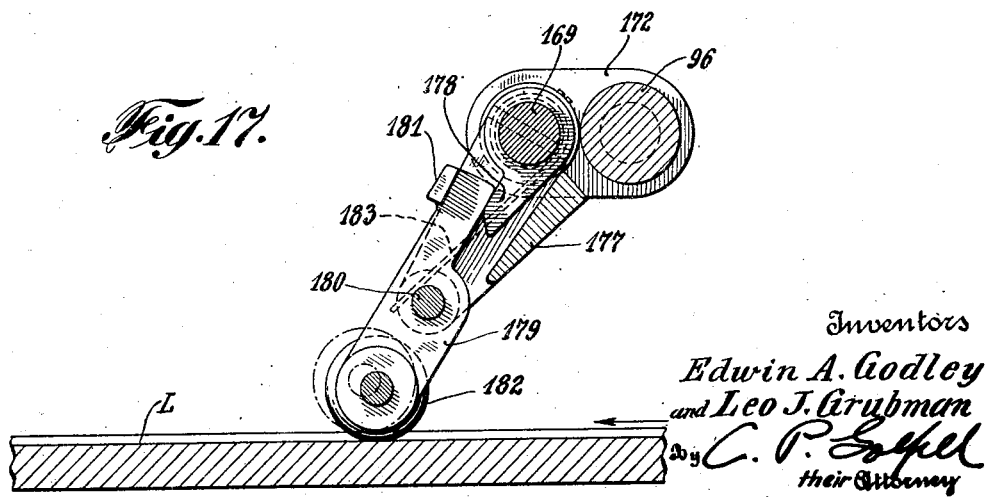
Figure 17 is a detail section illustrating certain of the parts seen in Figure 16.

For the purpose of insuring accuracy in the cubic measurement of the boards and in order to prevent registration of a greater number of cubic feet than the board actually contains due to the fact that the board is warped, or varies in thickness across its width, we have provided the means illustrated more particularly in Figs. 13, 16 and 17 of the drawings. This means includes the forked members 177 which are loosely mounted on the shaft 169 between the bearing arms 172. In the present instance we show three of these members, though a greater or lesser number may be employed, as desired. Between the arms of each of these members 177 a stop finger 178 is fixed upon the shaft 169. Between the extremities of the fork arms a knuckle 179 is loosely pivoted upon the pin 180. This knuckle is in the form of a bar which extends above and below the pivot pin 180 and at its upper end is provided with a stop flange 181 to engage upon the edges of the arms of the fork 177 and thus limit the swinging or pivotal movement of the knuckle 179 in one direction with respect to said fork. The lower end of the knuckle carries rollers 182 for engagement with the upper surface of the board. Normally, or when the device is not in operation, the forked members 177 and the roller carrying knuckles associated therewith assume the relative positions seen in dotted lines in Fig. 16 of the drawings. The forked arms and knuckles are urged to this normal position by means of suitable torsional coil springs 183 arranged upon the rod 96 and having bearing engagement upon the upper sides of the pivot pins 180 on which the knuckles 179 are mounted. When a board is moved in the direction indicated by the arrow in Fig. 16 against the loosely hanging knuckles 179, said knuckles are first moved relative to the fork members until the stop flange 181 engages with said members and the knuckles assume a position where the axis of the rollers 182 is in substantial alignment with the axes of the pin 180 and shaft 169. Thereafter, the knuckle and the forked member will move or swing upwardly against the action of spring 183 as a unit. The extent of this unitary movement obviously, will differ with any variation in the thickness of the different portions of the board with which the rollers 182 may happen to come in contact. The spring 175 acting to rotate the shaft 169 obviously holds the stop fingers 178 fixed to said shaft in contact with the upper ends of the knuckles 179.

Therefore, rotative movement of the shaft 169 will be limited by the knuckle 179 which occupies the lowermost position, while the other knuckles which may be engaged with thicker portions of the board, will move together with the forked members in which they are mounted relative to the shaft 169 and away from the associated stop fingers 178. Thus, the extent of sliding movement imparted to the pinion 157 by the arm 161 is determined by the portion of the board which contacts with the rollers 182 occupying the lowermost position. It is obvious that since gear 150 is fixed on the shaft 125, the square surface area of the board will thus be multiplied by its thickness, resulting in the transmission of movement through shafts 156 and 145 to the shaft of the odometer 143 whereby the latter is actuated to accurately register the cubic or board foot contents of the board. Since in the case of boards which are warped or of non-uniform thickness, the board must be planed down to an even thickness before it can be used for most purposes, it will thus be apparent that the mechanism above referred to will be highly accurate in determining the cubic contents of the boards.

The mechanism for automatically throwing the individual odometers 142 into gear with the measuring mechanism in accordance with different quality grades, the identification characters of which have been previously stamped or marked upon the boards in the manner above explained, is shown more particularly in Figures 20, 22, 23 and 24 of the drawings. This mechanism includes a vertical shaft 184 mounted in spaced parallel relation to the shaft 145. Upon this shaft vertically spaced collars 185 are fixed, each having a cam 186. These cams of the collars 185 are located in relatively different positions diametrically of the shaft 184. Between the shafts 145 and 184, levers 187 are fulcrumed intermediate of their ends, as at 188, each lever having a yoke 189 on one end the arms of which are provided with pins engaged with the circumferentially grooved sleeves 190 of the respective gears 147 keyed on the shaft 145. The other end of each lever 187 is also provided with a pin 191 for engagement by the cams 186 of the respective members 185.

At its lower end, the shaft 184 is provided with a spiral gear 192 with which a similar gear 193 fixed upon a shaft 194 mounted in the bearing 195 is engaged. A second shaft 196 is arranged in axial alignment with the shaft 194 and has a reduced end portion loosely engaged in a longitudinal bore in the shaft 194. Upon the shaft 196 a collar 197 is fixed. A torsional spring 198 surrounds the opposed end portions of the shafts 194 and 196 and at its ends is fixed to the collar 197 and to the gear 193 respectively. The opposed ends of the shafts are provided with stop lugs 199 which are so arranged as to permit rotation of the shaft 196 in one direction relative to shaft 194 and act to limit the rotation of shaft 194 relative to the shaft 196 under the action of the spring 198. The other end of the shaft 196 is connected by the spiral gears 200 with one end of the main shaft 22 of the grade marking or stamping mechanism.

To the upper end of the shaft 184 a disc 201 is fixed, said disc being provided in its periphery with equi-distantly spaced notches 202 having rounded or convex side edges. These notches are adapted to receive a locking finger 203 on the end of an arm 204 which is fixed to or integrally formed with the carrying arm 111 of the measuring roller 113.

The operation of the mechanism just described will be understood as follows: When the marking mechanism is set by the operation of one of the levers 74 in the manner above described, rotation is transmitted from the shaft 22 to shaft 196 and if there is no board passing between the measuring rollers, the gear 193 is also rotated through the medium of the flexible spring connection 198 and shaft 184 is thereby rotated to an extent determined by the rotation of shaft 22 which is limited by the stop means of lever 74 engaging one of the stop lugs on the disc 65. The cam 186 of the collar 185 which corresponds with said stop lug on the disc 65 is thereby caused to engage the pin 191 of one of the levers 187, thus rocking said lever and shifting the gear 147 with which said lever is connected, into engagement with the pinion 144 of one of the odometers which registers the measurements of that particular grade of lumber. When the board after leaving the marking mechanism passes between the measuring rollers and raises the upper roller 113, the finger 203 is moved downwardly into engagement with one of the notches 202 in the disc 201, thereby locking the shaft 184 against any possible further rotation while the board is passing between the measuring rollers. Thus the operative connection between the odometer which registers the cubic measurements of the particular grade of board engaged with the measuring rollers is maintained, while the actuating gears 147 for all of the other odometers in the series remain in their inoperative positions on the shaft 145 with respect to the odometer pinions 144.

When the marking mechanism is reset, while a board is still passing between the rollers 101 and 113 of the measuring mechanism, since the shaft 184 is locked by the finger 203, the gear 193 cannot of course, be rotated. The shaft 196 in such case is rotated relative to the shaft 194, and the flexible connecting spring 198 is placed under torsional stress. Therefore, as soon as the board being measured passes entirely beyond the measuring rollers, thus releasing the locking finger 203 from engagement with the disc 201, the spring 198 will unwind, and thereby rotate the shaft 194 and gear 193 so as to rotate the shaft 184 to an extent determined by the position of lug 199 in the previous rotation of the shaft 196. This action will engage the cam of another of the members 185 with the pin 191 of another of the gear shifting levers 187, thereby connecting another odometer 142 corresponding to the grade of lumber for which the marking mechanism is reset, with the measuring mechanism while the odometer which was formerly connected with said mechanism is disconnected therefrom by the shifting of its actuating gear 147. In this manner it will be seen that the odometers are selectively and automatically connected to the measuring mechanism for operation thereby to register the cubic measurement of the individual grades of lumber, in accordance with the setting of the marking mechanism to properly mark or stamp the grade character on the board as may have been determined upon by the attendant or observer.

In the interest of most complete accuracy in transferring the board measurements to the several odometers, we provide the measuring rollers 101 and 113 at one of their ends with the brake collars 205, which, as soon as a board has passed from between the measuring rollers, come into contact with each other thus causing said rollers to rotate at the same speed. Therefore, rotation of the differential or compensating gear frame 140 will instantly cease and though the rollers will continue to rotate, such rotation will be no longer transmitted to the odometers in terms of measure.

As shown in Figure 12 of the drawings, the gearing of the measuring mechanism for transmitting the movements of the measuring rollers to the odometers may be enclosed within a suitable housing or casing 206, and if desired, a similar housing or casing may obviously be provided to extend over the several other parts of the mechanism sufficient open space of course, being provided at opposite sides of the housing for the free passage of the board therethrough between the measuring rollers.

From the foregoing description considered in connection with the accompanying drawings, it is believed that the construction, manner of operation and several advantages of our present apparatus will be clearly and fully understood. Each of the three unitary parts thereof is of simple and compact construction, so that the apparatus as a whole will not occupy a very extensive floor space. It will be seen that the only manual operation required is the closing of the selecting switch or the operation of the proper lever 74 by the expert observer, after he has examined the board as it is mechanically turned or manipulated on the feeding table 5 and determined the proper grade thereof. The subsequent operations of the continued feeding, the marking and measuring of the board are all entirely automatic. By means of our invention we not only obtain the combined surface area measurements of all grades of lumber passing through the apparatus, but in addition thereto, we also automatically ascertain in a very accurate manner the combined cubic contents of all grades of lumber and secure separate registration of the cubic contents or board foot measurement of all boards of each of the different grades passing through the machine. Thus the mill owner or operative handling many thousands of feet of lumber daily, is relieved of a great amount of manual labor, while the element of human error which exists in the process of mental computation in measuring such materials, is obviated and an entirely accurate and reliable record can be obtained of the total output of each grade of lumber from the mill for a predetermined length of time.

Since the several parts of the apparatus in view of its manifold functions and capabilities, is of relatively simple construction, very few and infrequent repairs will be required, and the initial installation cost will also be comparatively small in relation to the economies which may be effected in the operation of the mill due to the possibility of maintaining an accurate check on the output, and thus eliminating loss due to intentional or accidental erroneous caluculations or excessive waste.

In so far as we are aware, we believe that we are the first in the art to provide a grade marking or stamping mechanism which may be selectively controlled and reset to stamp the proper grade upon the boards as they are fed in rapid succession over the surface of the bed plate or table. This mechanism, either with or without the measuring mechanism, can be conveniently employed in connection with a lumber conveyor or stacking apparatus, or in conjunction with a planing machine. It is also obviously possible to use the measuring mechanism as an individual unit, and in such case provide manual means for shifting the actuating gears of the several odometers. With regard to this portion of our present invention, we consider the improved means above described for automatically taking care of boards varying in thickness or which have become warped, whereby the cubic contents of such boards are also accurately measured, a feature of primary importance.

It is apparent from what has been said that though we have disclosed in the foregoing description and drawings an embodiment of the apparatus which we believe to be thoroughly practicable, the several purposes in view might nevertheless be attained by other embodiments of such apparatus. Accordingly, it is to be understood that we reserve the privilege of adopting all such alternative constructions and resorting to various other combinations and arrangements of the several co-operating parts of the mechanism, without departing from the spirit and scope of our invention as defined in the appended claims.

We claim:

1. In combination with lumber feeding mechanism, means automatically actuated by a moving board to apply a grade indicating symbol thereto, additional means automatically operated by the board without interruption of its movement to register the measurement of the board, and means operatively connected with said symbol applying means and controlling the effective operation of said measurement registering means.

2. In combination with lumber feeding mechanism, spaced mechanisms located in the line of feed of the boards and automatically actuated by a board without interruption of its feeding movement to first apply a grade indicating symbol to the board and then register the measurement of the board, and means operatively connecting said spaced mechanisms with each other and controlling the effective operation of the measurement registering mechanism.

3. In combination with lumber feeding mechanism, spaced mechanisms located in the line of feed of the boards and automatically actuated by a board without interruption of its feeding movement, one of said mechanisms including selectively controllable means for applying one of a series of indicative symbols to the board in accordance with the grade thereof and manually operable means for governing actuation of the latter means, and the other of said mechanisms including automatic means for separately registering the measurements of the different grades of boards, and means operatively connected with the first named mechanism and automatically controlling the effective operation of the latter mechanism.

4. In combination, spaced mechanisms each automatically actuated by a moving board and operating respectively to apply a grade indicating symbol to the board and to register the measurement of the board, said registering mechanism including a plurality of integrators normally disconnected from said mechanism, and means for selectively establishing an operative connection between said integrators and said mechanism in accordance with the particular grade symbol applied to the board.

5. In combination, spaced mechanisms each automatically actuated by a moving board and operating respectively to apply a grade indicating symbol to the board and to register the measurement of the board, the symbol applying mechanism having a plurality of symbol carrying members, means for selectively positioning said members for engagement with the board when said mechanism is actuated thereby, said registering mechanism including a plurality of integrators normally disconnected from said mechanism, and means operatively connected with said selecting means for establishing an operative connection between one of said integrators and the measuring mechanism.

6. In combination, spaced mechanisms each automatically actuated by a moving board and operating respectively to apply a grade indicating symbol to the board and to register the measurement of the board, the symbol applying mechanism having a plurality of symbol carrying members, means for selectively positioning said members for engagement with the board when said mechanism is actuated thereby, said registering mechanism including a plurality of integrators normally disconnected from said mechanism, means operatively connected with said selecting means for establishing an operative connection between one of said integrators and the measuring mechanism, said connecting means comprising relatively movable parts permiting of the operation of said means for selectively positioning the grade carrying symbols while said measuring mechanism is operatively engaged with a board.

7. In combination with lumber feeding mechanism, a mechanism located in the line of feed and including a series of registering devices, operating means for said devices having parts engaged and actuated by the board, and manually controlled means for selectively connecting said devices to the operating means to separately register the quantity of each grade of lumber.

8. In combination with lumber feeding mechanism, a manually controllable means located in the line of feed to apply a predetermined grade indicating symbol to each piece of lumber, a series of registering devices, operating means for said devices having parts engaged and actuated by the board without interruption of its feeding movement, and means automatically operating after each board has passed out of engagement with said parts, to selectively connect the registering devices with said operating means in accordance with the grade indicating symbol applied to the succeeding board and thereby separately register the quantity of each grade of lumber.

9. In combination, lumber feeding means, and co-operatively associated mechanisms receiving the lumber from the feeding means, said mechanisms including manually controlled means for applying a predetermined grade indicating symbol to each piece of lumber, means for separately registering the quantity of each grade of lumber fed to said mechanism by the feeding means, and a single manually controllable selecting means governing the effective operation of said mechanisms.

10. In combination, lumber feeding means, and cooperatively associated mechanisms receiving the lumber from the feeding means, said mechanisms including means for applying a grade indicating symbol to each piece of lumber, means for separately registering the quantity of lumber of each grade and also registering the aggregate quantity of lumber of all grades fed to said mechanism by the feeding means, and means operatively connected with said symbol applying means for automatically controlling the effective operation of the registering means in accordance with the particular grade symbol applied to the lumber.

11. In a measuring apparatus, an integrator, means engaged and operated by the material to be measured in the relative movement of said means and material, means operatively connected with said first named means to transfer the movement thereof to said integrator in terms indicative of a unit of measurement of the material, and additional manually controlled means operatively connected with said last named means also engaged and actuated by the material being measured to automatically control and modify the operation of said transfer means in accordance with variations in structural form of the material.

12. In a measuring apparatus, an integrator, a rotatably supported element actuated by contact with the material to be measured in the relative movement of said element and the material, means for transferring the rotative movement of said element to the integrator in terms indicative of a unit of measurement of the material, and manually controlled means operatively connected with said last named means and operable independently of said element to control and modify the operation of said transfer means to compensate for variations in structural form of the material.

13. In a measuring apparatus, an integrator, a rotatably supported element adapted to be engaged and actuated by the material in the relative movement of said element and material, means for transferring the rotative movement of said element to the integrator in terms indicative of a unit of measurement of the material, and additional manually controlled means operatively connected with said last named means and also actuated by the material and responsive to variations of form in the physical structure thereof to automatically govern and modify the operation of said transfer means in accordance with such varying physical characteristics.

14. In a measuring apparatus, rotatably supported means adapted to be engaged and rotated by movement of the material being measured, an integrator, means for transferring the rotative movement of said first named means to the integrator in terms indicative of a unit of measurement of the material, and means operatively connected with said last named means and engaging the material being measured to automatically control the operation of the transfer means as determined by variations in structural form of the material.

15. In a measuring apparatus, a rotatably supported measuring roller adapted to be rotated by the movement of a board to be measured in contact therewith an integrator, means for transferring the rotative movement of the roller to the integrator in terms of the board feet of the board, and means operatively engaged with said last named means and engaged with said board and controlling the operation of the transfer means whereby the transfer of the rotative movement of said roller to the integrator is modified and governed by those parts of the board having the least thickness.

16. In a lumber measuring apparatus, a rotatably supported roller adapted to be engaged and actuated by movement of the board to be measured, an integrator, means for transferring the rotative movement of the roller to the integrator in terms of the cubic measurement of the board, said means including a planetary gear and a pinion shiftable radially thereof, and means for shifting said pinion including spaced independently operating devices each having a part adapted to be engaged by the board at spaced points across the width thereof and means operatively controlled by said devices to limit the shifting movement of the pinion in one direction to an extent determined by that portion of the board having the least thickness.

17. In a lumber measuring apparatus, a rotatably supported roller adapted to be engaged and rotated by movement of a board being measured therewith, an integrator, and means for transferring the rotative movement of the roller to the integrator in terms of the cubic measurement of the board, said means including a planetary gear, a pinion movable radially across the toothed face of said gear and in constant driving relation therewith, means acting to urge said pinion towards the periphery of the gear, and spaced independently operable stop devices arranged transversely of the board and actuated thereby, each of said devices including means whereby such radial shifting movement of the pinion is governed and limited by that portion of the board having the least thickness.

18. In a lumber measuring apparatus, a supporting table, rotatable measuring means mounted thereon adapted to be engaged and actuated by a moving board, an integrator, means for transferring the movement of the measuring means to the integrator in terms of the cubic measurement of the board, said means including two rotatable motion transmission members, one shiftable relative to the other, and having their axes arranged at right angles to each other and disposed in constant driving relation, means for shifting one of said members radially with respect to the other, said means consisting of a shaft operatively connected to said shiftable member, a spring acting to rotate said shaft in one direction and urge the shiftable transmission member towards the periphery of the other member, and spaced devices loosely suspended from said shaft and having parts engaging the surface of the board at transversely spaced points thereon, and spaced stop fingers fixed to said shaft each associated with one of said parts and adapted by contact with the part engaging that portion of the board the surface of which is at the lowest elevation above the table surface to limit such movement of the shiftable transmission member.

19. In a lumber measuring apparatus, opposed independently rotatable measuring members between which a board is adapted to be moved, said members having parts of relatively different diameters engaging upon opposite edges of the board, an integrator, means for transferring the rotative movements of said measuring members to the integrator in terms of a unit of measurement of the board, and means automatically acting when the board is withdrawn from between the measuring members to permit of the continued rotation of said members at the same speed without transferring such continued rotative movements of the members to the integrator.

20. In a lumber measuring apparatus, measuring members adapted to be engaged and actuated by a board, a plurality of integrators upon which the measurements of boards of different grades are respectively registered, mechanism for transferring the movements of said measuring members to the integrators, and means for selectively establishing an operative connection between said transferring mechanism and the individual integrators in accordance with the grade of the board being measured.

21. In a lumber measuring apparatus, measuring members adapted to be engaged and actuated by a board, a plurality of integrators upon which the measurements of boards of different grades are respectively registered, mechanism for transferring the movements of said measuring members to the integrators, means for selectively establishing an operative connection between said transferring mechanism and the individual integrators in accordance with the grade of the board being measured, and means automatically operated when a board is engaged with said measuring members to lock said last named means against operation and prevent the disconnection of the selected integrator from the transfer mechanism, or the connection of any one of the remaining integrators with said mechanism.

22. In a lumber measuring apparatus, opposed rotatably mounted measuring rollers movable bodily towards and from each other and actuated by contact with a board moving longitudinally therebetween, means yieldingly urging said rollers into contact with the opposite sides of the board, a series of integrators, mechanism for transferring the rotative movements of said rollers adapted to operate the integrators to register the measurements of different grades of boards thereon, and means for selectively establishing an operative connection between said mechanism and the integrators in accordance with the grade of board being measured.

23. In a lumber measuring apparatus, opposed rotatably mounted measuring rollers movable bodily towards and from each other and actuated by contact with a board moving longitudinally therebetween, means yieldingly urging said rollers into contact with the opposite sides of the board, a series of integrators, mechanism for transferring the rotative movements of said rollers adapted to operate the integrators to register the measurements of different grades of boards thereon, means for selectively establishing an operative connection between said mechanism and the integrators in accordance with the grade of board being measured, and means for locking the last named means against operation including a part movable with one of said rollers to automatically render said locking means effective upon the insertion of a board between the rollers.

24. In combination with a lumber feeding and measuring mechanism, means for applying the grade indicating symbol to the lumber being fed to the mechanism, manually controlled means for controlling the grade indicating symbol applying means, and means controlled by the symbol applying means and operating by the movement of the board to register the measurement of the board.

25. In combination with a lumber feeding and measuring mechanism, means for applying a grade indicating symbol to the lumber being fed through the mechanism, manually controlled means for controlling the grade indicating symbol applying means, and means automatically operated by the movement of the board and selected by the symbol applying means for registering the measurement of the board.

26. In combination with a lumber feeding and measuring mechanism, means actuated by the movement of the board for applying a grade indicating symbol thereto, manually controlled means for controlling the grade indicating symbol applying means, and means operated by the board and selected by the symbol applying means to register the measurement of the different grade of board.

27. In combination with a lumber feeding and measuring mechanism, means for applying a grade indicating symbol to the lumber fed through the mechanism, manually controlled means for controlling the grade indicating symbol applying means, manually operated means for changing said symbol applying means, and means operated by the board and selected by the symbol applying means to register the measurement of the boards bearing the different symbols.

28. The combination with a lumber feeding and measuring mechanism, means for applying a grade indicating symbol to the lumber being fed through the machine and actuated by the lumber, manually controlled means for controlling the grade indicating symbol applying means, manually controlled means for changing said symbol, and means operated by the lumber without interruption of its movement to register the measurement of the lumber bearing the different symbols.

29. In combination with a lumber feeding and measuring mechanism, means for applying a grade indicating symbol to the lumber being fed through the mechanism and actuated by the moving lumber, manually controlled means for controlling the grade indicating symbol applying means, manually controlled means for changing the indicating symbol, and means operated by the lumber and thrown into the operation by the symbol applying means for registering the measurement of the lumber bearing the different symbols.

30. In combination with a lumber feeding and measuring mechanism, means for applying a grade indicating symbol to the lumber being fed through the machine and operated by the moving lumber, manually controlled means for controlling the grade indicating symbol applying means, manually controlled means for changing said symbol, and means operated by the lumber without interruption of its movement through the machine and set into operation by the symbol applying means to register the measurement of the lumber bearing the different symbols.

In testimony that we claim the foregoing as our invention we have signed our names hereunder.

LEO J. GRUBMAN.
EDWIN A. GODLEY.